United States Patent
Hayashi

(10) Patent No.: US 11,809,192 B2
(45) Date of Patent: Nov. 7, 2023

(54) AUTONOMOUSLY ACTING ROBOT WHOSE ACTIVITY AMOUNT IS CONTROLLED

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 0 days.

(21) Appl. No.: 18/153,352

(22) Filed: Jan. 12, 2023

(65) Prior Publication Data

US 2023/0168682 A1    Jun. 1, 2023

Related U.S. Application Data

(63) Continuation of application No. 16/239,534, filed on Jan. 4, 2019, now Pat. No. 11,579,617, which is a (Continued)

(30) Foreign Application Priority Data

Jul. 11, 2016  (JP) .................. 2016-137188

(51) Int. Cl.
*A63H 29/22*         (2006.01)
*G05D 1/02*          (2020.01)
(Continued)

(52) U.S. Cl.
CPC .............. *G05D 1/0217* (2013.01); *A63H 3/40* (2013.01); *A63H 11/00* (2013.01); *A63H 29/22* (2013.01);
(Continued)

(58) Field of Classification Search
CPC .......... A63H 3/40; A63H 11/00; A63H 29/22; A63H 2200/00; B25J 11/0015; G05D 1/008; G05D 1/0217; G05D 2201/0214
See application file for complete search history.

(56) References Cited

U.S. PATENT DOCUMENTS 6,480,761 B2   11/2002   Ueno et al.
6,560,511 B1    5/2003   Yokoo et al.
(Continued)

FOREIGN PATENT DOCUMENTS

CN    1148281 C    5/2004
CN    2813032 Y    9/2006
(Continued)

OTHER PUBLICATIONS

Kazuo Yano, "Invisible Hand of Data", Jul. 2014, 26-27 pages, Soshisha, Japan, 1pp.
(Continued)

*Primary Examiner* — Dale Moyer
(74) *Attorney, Agent, or Firm* — HAUPTMAN HAM, LLP

(57) ABSTRACT

A robot includes an operation control unit that selects a motion of the robot, a drive mechanism that executes a motion selected by the operation control unit, and a remaining battery charge monitoring unit that monitors a remaining charge of a rechargeable battery. Behavioral characteristics of the robot change in accordance with the remaining battery charge. For example, a motion with a small processing load is selected at a probability that is higher the smaller the remaining battery charge. Referring to consumption plan data that define a power consumption pace of the rechargeable battery, the behavioral characteristics of the robot may be caused to change in accordance with a difference between the remaining battery charge scheduled in the consumption plan data and the actual remaining battery charge.

20 Claims, 13 Drawing Sheets

Related U.S. Application Data continuation of application No. PCT/JP2017/025082, filed on Jul. 10, 2017.

(51) Int. Cl.
    *A63H 11/00*     (2006.01)
    *A63H 3/40*     (2006.01)
    *B25J 11/00*     (2006.01)
    *G05D 1/00*     (2006.01)

(52) U.S. Cl.
    CPC ........ *B25J 11/0015* (2013.01); *G05D 1/0088* (2013.01); *A63H 2200/00* (2013.01); *G05D 2201/0214* (2013.01)

(56) References Cited

U.S. PATENT DOCUMENTS

| | | | |
|---|---|---|---|
| 6,565,371 B1 | 5/2003 | Watanabe | |
| 6,684,127 B2 | 1/2004 | Fujita et al. | |
| 8,222,840 B2 | 7/2012 | Tanaka et al. | |
| 2002/0007230 A1* | 1/2002 | Ueno | B25J 19/005 700/247 |
| 2002/0024312 A1 | 2/2002 | Takagi | |
| 2002/0081937 A1 | 6/2002 | Yamada et al. | |
| 2002/0144167 A1 | 10/2002 | Kobayashi et al. | |
| 2003/0045203 A1 | 3/2003 | Sabe et al. | |
| 2003/0078696 A1 | 4/2003 | Sakamoto et al. | |
| 2004/0210347 A1 | 10/2004 | Sawada et al. | |
| 2004/0225410 A1 | 11/2004 | Aoyama et al. | |
| 2007/0192910 A1 | 8/2007 | Vu et al. | |
| 2007/0250212 A1 | 10/2007 | Halloran et al. | |
| 2008/0011244 A1 | 1/2008 | Gick | |
| 2008/0312772 A1 | 12/2008 | Hasegawa et al. | |
| 2009/0191526 A1 | 7/2009 | Kumazawa et al. | |
| 2010/0023163 A1 | 1/2010 | Kidd | |
| 2010/0152945 A1 | 6/2010 | Park et al. | |
| 2012/0165979 A1 | 6/2012 | Lim et al. | |
| 2013/0123987 A1 | 5/2013 | Kase et al. | |
| 2013/0146090 A1* | 6/2013 | Ko | G05D 1/021 134/18 |
| 2013/0178982 A1 | 7/2013 | Wong et al. | |
| 2014/0046595 A1 | 2/2014 | Sagawa et al. | |
| 2015/0026487 A1 | 1/2015 | Choi et al. | |
| 2016/0207521 A1 | 7/2016 | Ogawa | |
| 2017/0120446 A1 | 5/2017 | Veltrop et al. | |
| 2017/0216120 A1 | 8/2017 | Tsusaka et al. | |
| 2017/0344014 A1 | 11/2017 | Wu | |
| 2019/0185105 A1* | 6/2019 | Takatsuka | B62J 43/13 |

FOREIGN PATENT DOCUMENTS

| | | |
|---|---|---|
| CN | 202289438 U | 7/2012 |
| DE | 10049344 A1 | 4/2001 |
| EP | 2933065 A1 | 10/2015 |
| JP | 2000323219 A | 11/2000 |
| JP | 2001162058 A | 6/2001 |
| JP | 2001191275 A | 7/2001 |
| JP | 2001191276 A | 7/2001 |
| JP | 2002307354 A | 10/2002 |
| JP | 200371763 A | 3/2003 |
| JP | 200371772 A | 3/2003 |
| JP | 2003251580 A | 9/2003 |
| JP | 2004249393 A | 9/2004 |
| JP | 2005198704 A | 7/2005 |
| JP | 2008238383 A | 10/2008 |
| JP | 2012220783 A | 11/2012 |
| JP | 2014131292 A | 7/2014 |
| JP | WO2012172721 A1 | 2/2015 |
| JP | 2016103277 A | 6/2016 |

OTHER PUBLICATIONS

Office Action in JP Application No. 2017-566427, dated Apr. 3, 2018. 11pp.
Office Action in JP Application No. 2017-566427, dated Jul. 31, 2018. 7pp.
Office Action in JP Application No. 2017-566427, dated Oct. 23, 2018. 4pp.
International Search Report in PCT/JP2017/025082, dated Oct. 3, 2017. 9pp.
Written Opinion of the ISA in PCT/JP2017/025082 dated Oct. 3, 2017, 27pp.
Office Action in DE Application No. 112017003497.3, dated Apr. 7, 2020. 14pp.
Office Action in CN Application No. 201780042193.9, dated Apr. 20, 2020. 13pp.
Examination Report in GB Application No. 1900965.3, dated Mar. 30, 2021. 7pp.
Office Action in JP Application No. 2019-016943, dated Jun. 8, 2021. 11 pp.
Office Action in JP Application No. 2019-016943, dated Jan. 12, 2022. 10pp.
Office Action in JP Application No. 2019-016943, dated Aug. 2, 2022, 11pp.
https://pressbooks.bccampus.ca/practlcalphysicsphys1104/chapter/7-7-power/(Year:2020).
https://www.cuug.ab.ca/branderr/nuclear//petajoule.html (Year:2020).

* cited by examiner

FIG. 7

| MOTION | PROCESSING LOAD (LOAD VALUE) |
|:---:|:---:|
| C01 | 20 |
| C02 | 10 |
| C03 | 3 |
| C04 | 1 |
| C05 | 30 |
| C06 | 30 |
| ⋮ | ⋮ |

| EVENT | MOTION | SELECTION PROBABILITY (%) |
|---|---|---|
| J1 | C01 | 0 |
|  | C02 | 0.1 |
|  | C03 | 5.1 |
|  | ⋮ | ⋮ |
|  | Cx | 2.0 |
| J2 | C01 | 0.1 |
|  | C02 | 0.4 |
|  | C03 | 2.2 |
|  | ⋮ | ⋮ |

180

| ACTIVITY AMOUNT | CONSUMPTION PLAN |
|---|---|
| 200 — | D01 |
| 160 — 200 | D02 |
| 120 — 160 | D03 |
| 80 — 120 | D04 |
| 40 — 120 | D05 |
| 10 — 40 | D06 |
| — 10 | D07 |

188

AUTONOMOUSLY ACTING ROBOT WHOSE ACTIVITY AMOUNT IS CONTROLLED

RELATED APPLICATIONS

The present application is a continuation of application Ser. No. 16/239,534, filed Jan. 4, 2019, which is a continuation of International Application No. PCT/JP2017/025082, filed Jul. 10, 2017, which claims priority from Japanese Application No. 2016-137188, filed Jul. 11, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

A human keeps a pet in a search for solace. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides (refer to Patent Document 1). Although robot technology has advanced swiftly in recent years, the technology has not advanced so far as to realize a presence as a pet-like companion.

CITATION LIST

Patent Literature

Patent Document 1: JP-A-2000-323219

Non-Patent Literature

Non-patent Document 1: Kazuo YANO, "Invisible Hand of Data", Soshisha, July, 2014

SUMMARY OF INVENTION

Technical Problem

A living creature recovers vitality by eating and sleeping. Vitality of a living creature decreases when the living creature is hungry or lacking in sleep. A robot recovers vitality, that is, energy for activity, by being charged. Charging for a robot is similar to eating and sleeping for a living creature. The inventor thinks that by considering a relationship between a remaining battery charge and an activity amount, human-like or animal-like behavioral characteristics can also be realized by a robot. It is thought that if there were a robot that can autonomously select a human-like or animal-like action, empathy toward the robot could be greatly increased.

The invention, having been completed based on the heretofore described idea, has a main object of providing technology for rationally controlling an activity amount of a robot.

Solution to Problem

An autonomously acting robot in an aspect of the invention includes an operation control unit that selects a motion of the robot, a drive mechanism that executes a motion selected by the operation control unit, and a remaining battery charge monitoring unit that monitors a remaining charge of a rechargeable battery.

The operation control unit causes behavioral characteristics of the robot to change in accordance with the remaining battery charge.

An autonomously acting robot in another aspect of the invention includes an operation control unit that selects a motion of the robot, a drive mechanism that executes a motion selected by the operation control unit, a remaining battery charge monitoring unit that monitors a remaining charge of a rechargeable battery, and a recognizing unit that determines an occurrence of an event.

When a predetermined priority event occurs during charging, the operation control unit selects a motion responding to the priority event, even though charging is not completed.

An autonomously acting robot in another aspect of the invention includes an operation control unit that selects a motion of the robot, and a drive mechanism that executes a motion selected by the operation control unit.

The operation control unit selects a motion of the robot at a selection probability such that a negative correlation with respect to a processing load of the motion is established.

An autonomously acting robot in another aspect of the invention includes an operation control unit that selects a motion of the robot, a drive mechanism that executes a motion selected by the operation control unit, and a mode selection unit that selects either a normal mode or a power saving mode wherein a power supply is restricted more than in the normal mode.

When a predetermined return event occurs when set to the power saving mode, the operation selection unit executes a start-up motion correlated to the return event, and the mode selection unit changes from the power saving mode to the normal mode.

An autonomously acting robot in another aspect of the invention includes an operation control unit that selects a motion of the robot, a drive mechanism that executes a motion selected by the operation control unit, and a mode selection unit that selects either a normal mode or a power saving mode wherein a power supply is restricted more than in the normal mode.

When set to the power saving mode, the mode selection unit changes from the power saving mode to the normal mode with a moving object being detected as a condition.

An autonomously acting robot in another aspect of the invention includes an actuator, an operation control unit that transmits an actuating signal to the actuator, and a remaining battery charge monitoring unit that monitors a remaining charge of a rechargeable battery.

The operation control unit limits power supplied to the actuator more than at a normal time when the remaining battery charge reaches a predetermined threshold or lower.

An autonomously acting robot in another aspect of the invention includes an operation control unit that selects a motion of the robot, a drive mechanism that executes a motion selected by the operation control unit, a mode selection unit that selects either a first mode or a second mode, and an eye generating unit that causes a pupil image to change in accordance with the first mode and the second mode.

The mode selection unit changes to the second mode when a predetermined transition condition is satisfied in the first mode, and the eye generating unit causes the pupil image to move to the left and right in the first mode, and causes the pupil image to close in the second mode.

An autonomously acting robot in another aspect of the invention includes an operation control unit that selects a motion of the robot, a drive mechanism that executes a motion selected by the operation control unit, a remaining battery charge monitoring unit that monitors a remaining charge of a rechargeable battery, and a mode selection unit that selects either a normal mode or a power saving mode wherein a power supply is restricted more than in the normal mode.

The operation control unit selects an external charger as a movement target point when the remaining charge of the rechargeable battery reaches a predetermined threshold or less, and the mode selection unit changes from the normal mode to the power saving mode when an obstacle exists on a path of movement to the charger.

Advantageous Effects of Invention

According to the invention, empathy toward a robot is easily increased.

BRIEF DESCRIPTION OF DRAWINGS

FIG. 7 is a data structure diagram of a load table.
FIG. 8 is a data structure diagram of a motion selection table.
FIG. 1A is a front external view of a robot 100.
FIG. 1B is a side external view of the robot 100.

Figure 1A:
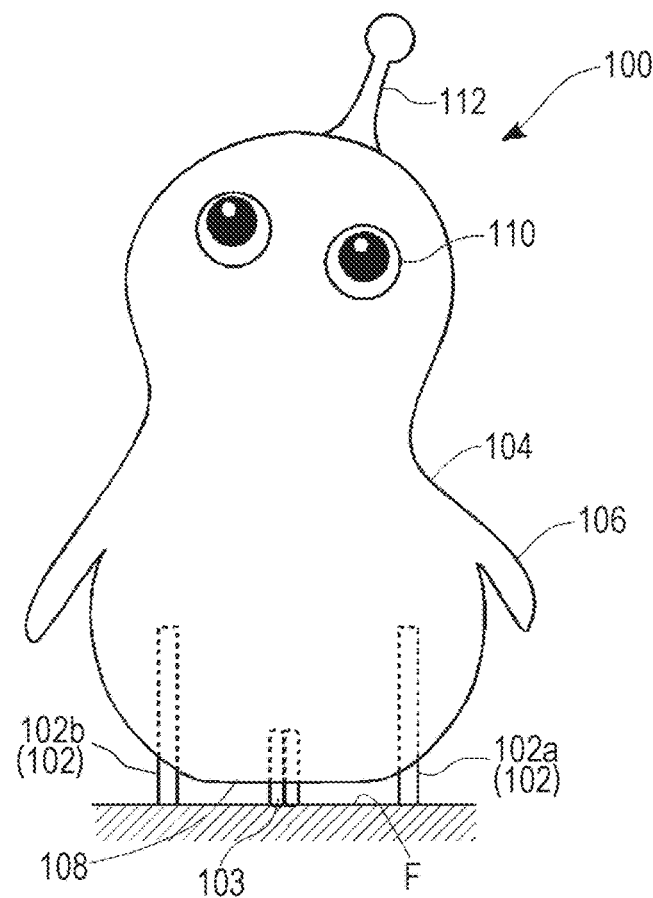
FIG. 1A is a front external view of a robot.
Figure 1B:
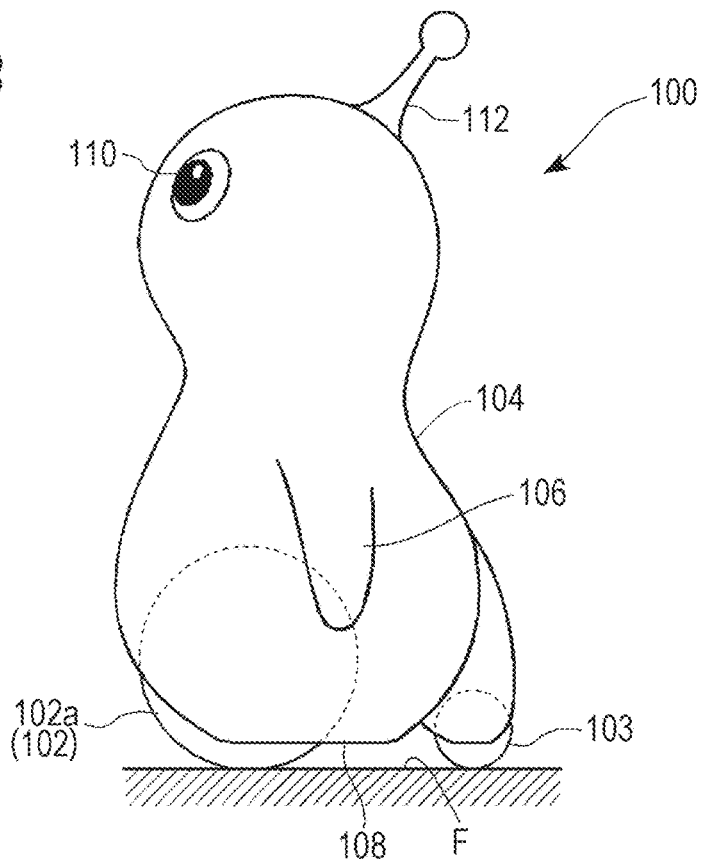
FIG. 1B is a side external view of the robot.

The robot 100 in this embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely stored in the body 104 using a drive mechanism (a pivoting mechanism and a linking mechanism). A greater portion of each wheel is hidden by the body 104 when traveling too, but when each wheel is completely stored in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a highly directional microphone and an ultrasonic sensor, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

Figure 2:
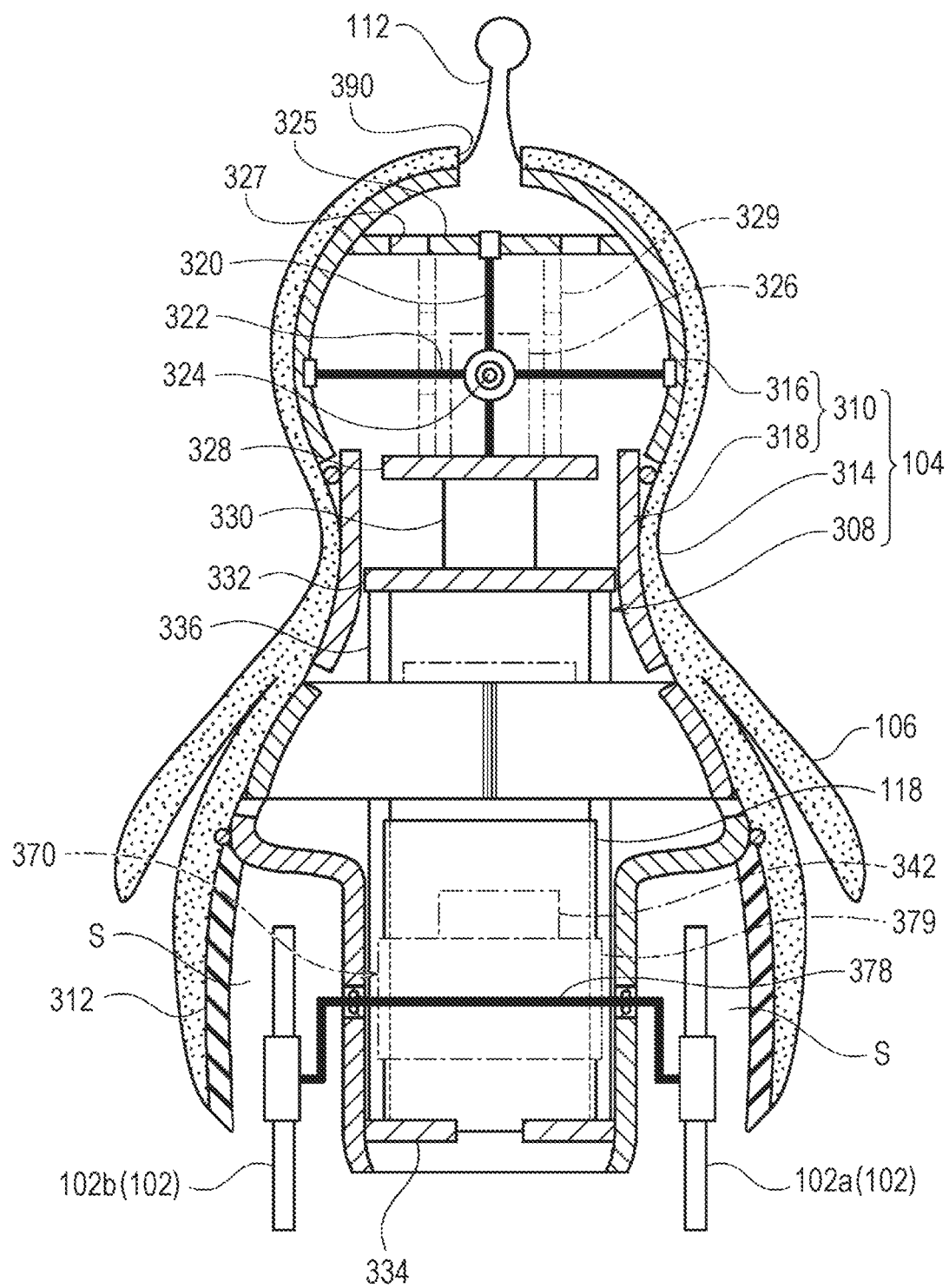
FIG. 2 is a sectional view schematically representing a structure of the robot.

FIG. 2 is a sectional view schematically representing a structure of the robot 100.

As shown in FIG. 2, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control device 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantagraph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 318 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 3:
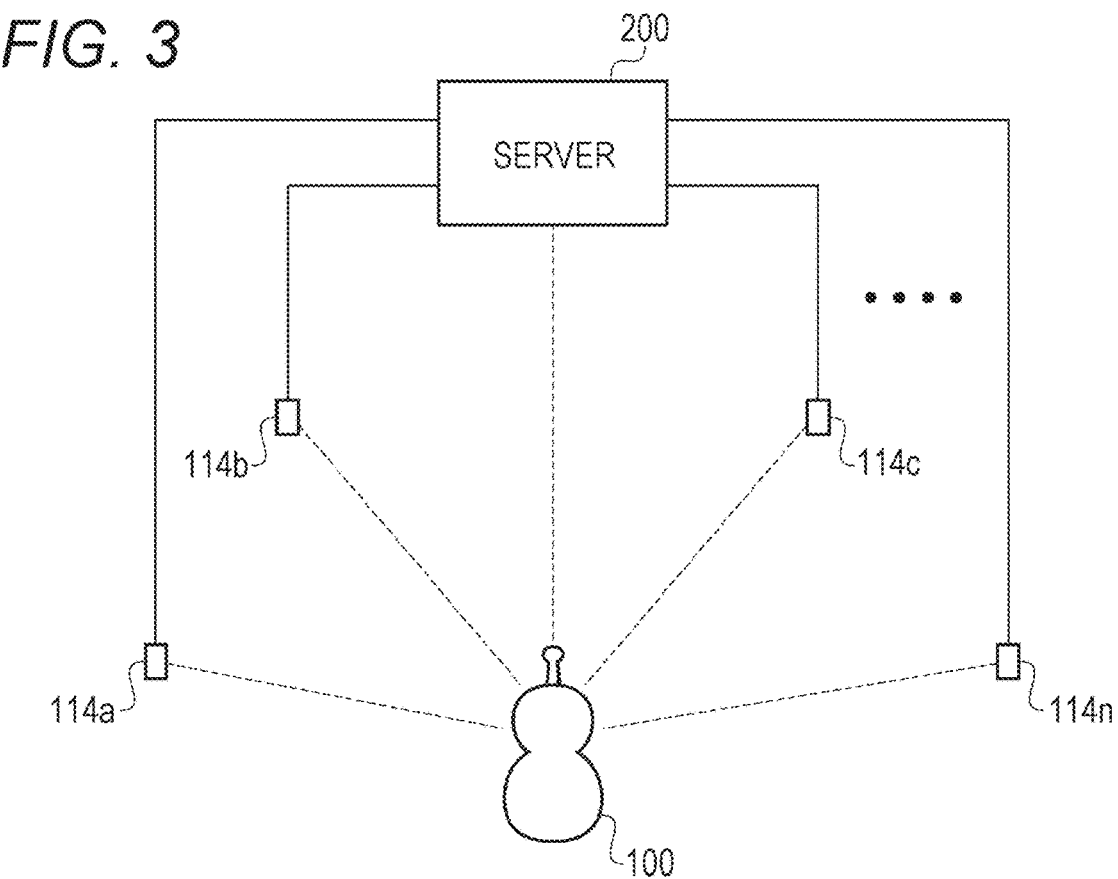
FIG. 3 is a configuration diagram of a robot system.

FIG. 3 is a configuration diagram of a robot system 300. The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment correspond one-to-one. The server 200 determines a basic action of the robot 100 based on information obtained from the sensors incorporated in the robot 100 and the multiple of external sensors 114.

The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits its own positional coordinates to the server 200 may also be adopted.

Figure 4:
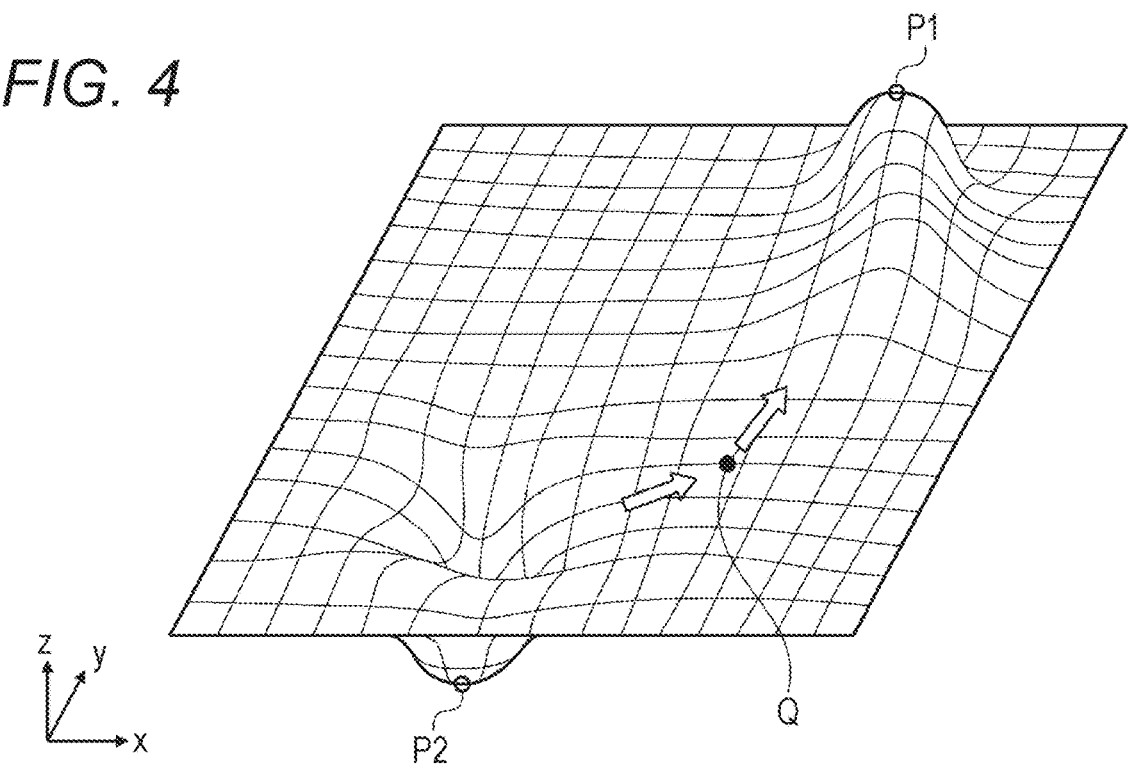
FIG. 4 is a schematic view of an emotion map.

FIG. 4 is a schematic view of an emotion map 116.

The emotion map 116 is a data table stored in the server 200. The robot 100 selects an action in accordance with the emotion map 116. The emotion map 116 shown in FIG. 4 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 4, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the front wheel 102 or the rear wheel 103, thereby identifying the current position, or may identify the current position based on an image obtained from the camera.

When the emotion map 116 shown in FIG. 4 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 4. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 5:
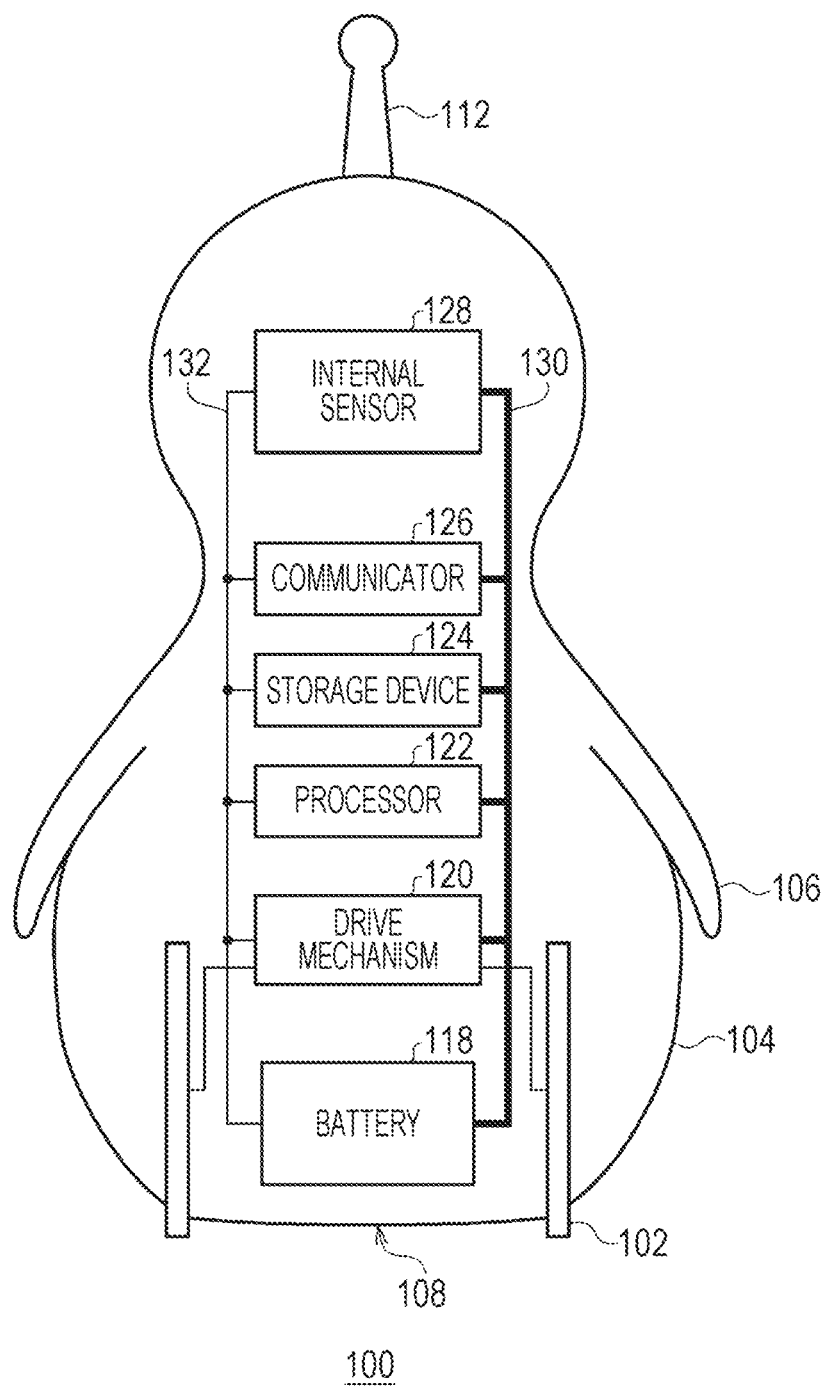
FIG. 5 is a hardware configuration diagram of the robot.

FIG. 5 is a hardware configuration diagram of the robot 100.

The robot 100 includes an internal sensor 128, a communicator 126, a storage device 124, a processor 122, a drive mechanism 120, and a battery 118. The drive mechanism 120 includes the heretofore described wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera, a highly directional microphone, an infrared sensor, a thermosensor, a touch sensor, an acceleration sensor, a smell sensor, and the like. The smell sensor is an already known sensor that applies a principle that electrical resistance changes in accordance with an adsorption of a molecule forming a source of a smell. The smell sensor classifies various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheels (front wheels 102) and the head portion (the head portion frame 316). The drive mechanism 120 changes a direction of movement and a movement speed of the robot 100 by changing the rotational speed and the direction of rotation of each of the two front wheels 102. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state.

Figure 6:
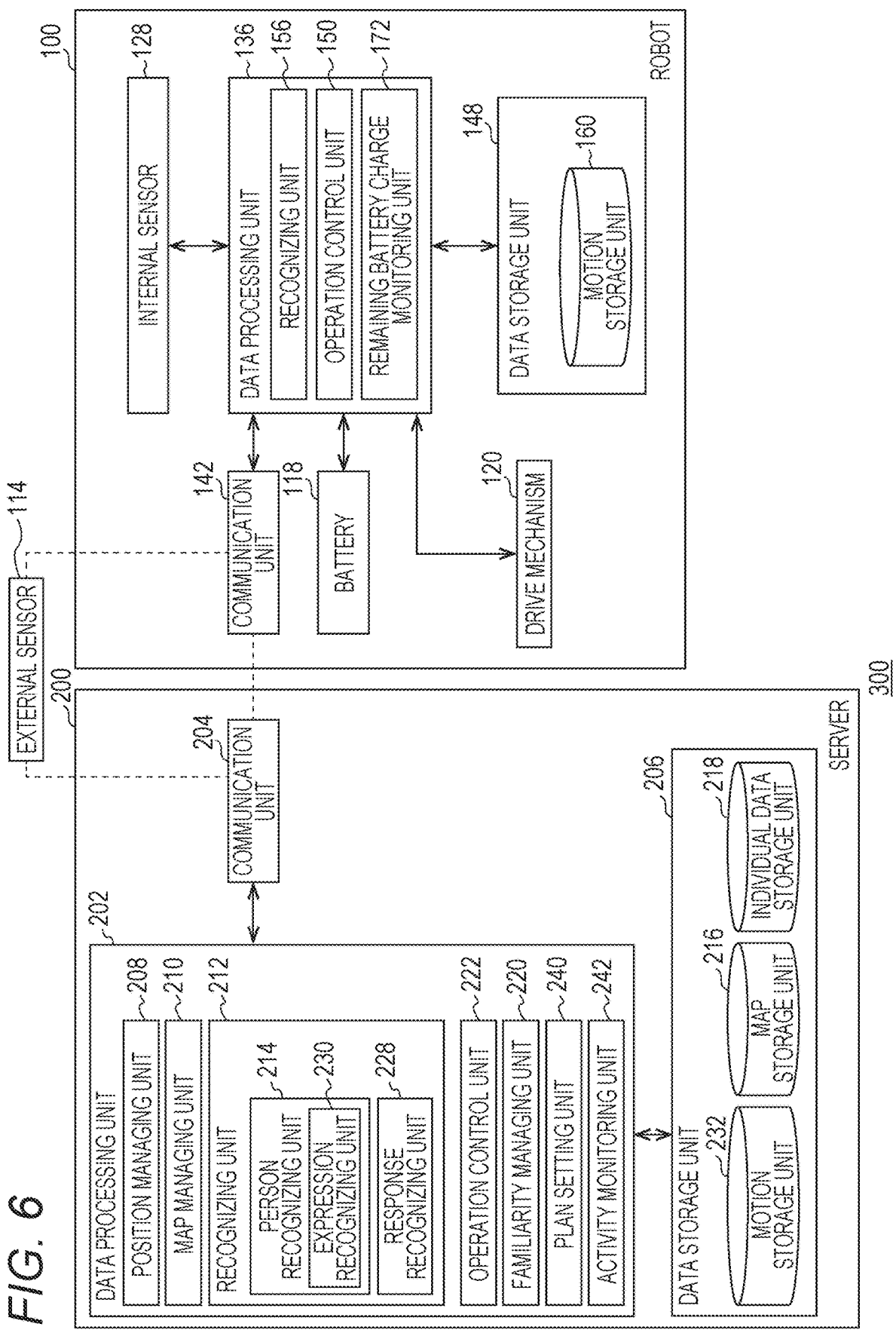
FIG. 6 is a functional block diagram of the robot system.

FIG. 6 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206.

The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218.

The robot 100 has a multiple of operation patterns (motions). Various motions, such as waving the arm, approaching an owner while meandering, and staring at an owner with the head to one side, are defined.

The motion storage unit 232 stores control details of a motion (a motion file). Each motion is identified by motion ID. The motion file is also downloaded into a motion storage unit 160 of the robot 100. Which motion is to be executed may be determined in the server 200, or may be determined in the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions performed by each actuator being controlled together with the passing of time in accordance with the motion file (actuator control information).

A shift time for changing from a preceding unit motion to a subsequent unit motion is called an "interval". It is sufficient that an interval is defined in accordance with time needed for a unit motion change or details of a motion. A length of an interval can be regulated.

Hereafter, settings involved in controlling an action of the robot 100, such as which motion is chosen and when, and output regulation of each actuator when realizing a motion, will collectively be called "behavioral characteristics". The behavioral characteristics of the robot 100 are defined by a motion selection algorithm, a motion selection probability, a motion file, and the like.

The map storage unit 216 stores a multiple of action maps. The individual data storage unit 218 stores information on a user, and in particular, on an owner. Specifically, the individual data storage unit 218 stores various kinds of parameter, such as familiarity with respect to a user, and physical characteristics and behavioral characteristics of a user. The individual data storage unit 218 may also store other attribute information such as age and gender.

The robot 100 identifies a user based on the user's physical characteristics or behavioral characteristics. The robot 100 constantly films a periphery using the incorporated camera. Further, the robot 100 extracts the physical characteristics and behavioral characteristics of a person appearing in an image. The physical characteristics may be visual characteristics inherent to a body, such as a height, clothes worn by choice, a presence or absence of spectacles, a skin color, a hair color, or an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information or other sensing information.

Although the method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In this embodiment, users are clustered based on physical characteristics and behavioral characteristics, and a user is identified using deep learning (a multilayer neural network). Details will be described hereafter.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, a familiarity managing unit 220, a plan setting unit 240, and an activity monitoring unit 242.

The position managing unit 208 identifies the positional coordinates of the robot 100 using a method relating to FIG. 3. The position managing unit 208 may also track positional coordinates of a user in real time.

The map managing unit 210 changes the parameter of each coordinate on the multiple of action maps using the method described in connection with FIG. 4. The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 infers an emotion of a user using image recognition of an expression of the user.

The person recognizing unit 214 also extracts characteristics of a moving object other than a person, for example, a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation control unit 222 of the server 200 determines a motion of the robot 100 in cooperation with an operation control unit 150 of the robot 100. The operation control unit 222 of the server 200 compiles a movement target point of the robot 100, and a movement route for the movement target point, based on an action map selection by the map managing unit 210. The movement control unit 222 compiles a multiple of movement routes, and having done so, may select any of the movement routes.

The operation control unit 222 selects a motion of the robot 100 from a multiple of motions of the motion storage unit 232. A selection probability is correlated for each situation to each motion. For example, a selection method such that a motion A is executed at a probability of 20% when a pleasant action is performed by an owner, and a motion B is executed at a probability of 5% when an air temperature is 30 degrees or higher, is defined.

A movement target point and a movement route are determined by an action map, and a motion is selected in accordance with various kinds of event to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that owner. When an unpleasant action is detected, the familiarity managing unit 220 reduces familiarity. Also, familiarity of an owner not visually recognized for a long period gradually decreases.

The plan setting unit 240 sets "consumption plan data". Consumption plan data define a power consumption pace of the battery 118. For example, in a case of consumption plan data for one hour (hereafter written as a "one hour plan"), a remaining charge of the battery 118 reaches a lower limit value after one hour of activity. In a case of a three hour plan, the remaining battery charge reaches the lower limit value after three hours of activity. As the power consumption pace of the three hour plan is slow compared with that of the one hour plan, the activity time is longer. In exchange for this, an activity amount per unit time of the robot 100 is restricted. Details of consumption plan data will be described hereafter.

The activity monitoring unit 242 records an operation history of the robot 100. Motion selections and positional coordinates of the robot 100 are recorded chronologically in the operation history. Various events, such as who the robot 100 met at what timing, and what kind of responsive action has been detected, are also recorded.

Robot 100

The robot 100 includes a communication unit 142, a data processing unit 136, a data storage unit 148, the battery 118, and the drive mechanism 120.

The communication unit 142 corresponds to the communicator 126 (refer to FIG. 5), and manages a process of communicating with the external sensor 114 and the server 200. The data storage unit 148 stores various kinds of data. The data storage unit 148 corresponds to the storage device 124 (refer to FIG. 5). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100.

Various kinds of motion file are downloaded into the motion storage unit 160 of the robot 100 from the motion storage unit 232 of the server 200. A motion is identified by motion ID. An operating timing, an operating time, an operating direction, and the like, of the various kinds of actuator (the drive mechanism 120) are defined chronologically in a motion file in order to perform various motions such as sitting by housing the front wheel 102, raising the arm 106, causing the robot 100 to carry out a rotating action by causing the two front wheels 102 to rotate in reverse or by causing only one front wheel 102 to rotate, shaking by causing the front wheel 102 to rotate in a state in which the front wheel 102 is housed, or stopping once and looking back when moving away from a user.

The data processing unit 136 includes a recognizing unit 156, the operation control unit 150, and a remaining battery charge monitoring unit 172.

The operation control unit 150 of the robot 100 determines motions of the robot 100 in cooperation with the operation control unit 222 of the server 200. One portion of motions may be determined by the server 200, and other motions may be determined by the robot 100. Also, a configuration may be such that although the robot 100 determines motions, the server 200 determines a motion when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 150 of the robot 100 determines a direction of movement of the robot 100 together with the operation control unit 222 of the server 200. Movement based on an action map may be determined by the server 200, and an immediate movement such as avoiding an obstacle may be determined by the operation control unit 150 of the robot 100. The drive mechanism 120 causes the robot 100 to head toward a movement target point by driving the front wheel 102 in accordance with an instruction from the operation control unit 150.

The operation control unit 150 of the robot 100 instructs the drive mechanism 120 to execute a selected motion. The drive mechanism 120 controls each actuator in accordance with the motion file.

The operation control unit 150 can also execute a motion of holding up both arms 106 as a gesture asking for "a hug" when a user with a high degree of familiarity is nearby, and can also perform a motion of no longer wanting to be hugged by repeatedly causing the left and right front wheels 102 to alternately rotate in reverse and stop in a housed state when bored of the "hug". The drive mechanism 120 causes the robot 100 to perform various motions by driving the front wheel 102, the arm 106, and the neck (head portion frame 316) in accordance with an instruction from the operation control unit 150.

The remaining battery charge monitoring unit 172 monitors the remaining charge of the battery 118. The remaining battery charge varies between 0 and 100%. Details will be described hereafter, but when the remaining battery charge reaches a lower limit value, 20% for example, the operation control unit 222 causes the robot 100 to head toward a charger. Also, when the remaining battery charge reaches an upper limit value, 80% for example, the operation control unit 222 issues an instruction to move away from the charger.

The recognizing unit 156 (a target detecting unit) of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films an exterior angle using the incorporated camera (the internal sensor 128), and detects a moving object such as a person or a pet. Characteristics thereof are transmitted to the server 200, and the person recognizing unit 214 of the server 200 extracts the physical characteristics of the moving object. Also, the recognizing unit 156 also detects a smell of the user and a voice of the user. Smell and sound (voice) are classified into multiple kinds using an already known method.

When a strong force is applied to the robot 100, the recognizing unit 156 recognizes this using an incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the front wheels 102 decreasing.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 of the server 200 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

When a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created.

Although the above is a simple example, the first profile corresponding to a father and the second profile corresponding to a mother are formed using the heretofore described method, and the robot 100 recognizes that there at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing".

It is assumed that the robot 100 newly recognizes a moving object (user) in a state in which this kind of cluster analysis is completed.

At this time, the person recognizing unit 214 of the server 200 extracts characteristics from sensing information of an image or the like obtained from the robot 100, and determines which cluster a moving object near the robot 100 corresponds to using deep learning (a multilayer neural network). For example, when a moving object that has a beard is detected, the probability of the moving object being the father is high. When the moving object is active early in the morning, it is still more certain that the moving object corresponds to the father. Meanwhile, when a moving object that wears spectacles is detected, there is a possibility of the moving object being the mother. When the moving object has a beard, the moving object is neither the mother nor the father, because of which the person recognizing unit 214 determines that the moving object is a new person who has not been cluster analyzed.

Formation of a cluster by characteristic extraction (cluster analysis) and application to a cluster accompanying characteristic extraction (deep learning) may be executed concurrently.

Familiarity toward a moving object (user) changes in accordance with how the robot 100 is treated by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A Cluster with Extremely High Familiarity

The robot 100 strongly expresses a feeling of affection by approaching a user (hereafter called "an approaching action"), and by performing an affectionate gesture defined in advance as a gesture indicating goodwill toward a person.

(2) A Cluster with Comparatively High Familiarity

The robot 100 carries out only an approaching action.

(3) A Cluster with Comparatively Low Familiarity

The robot 100 does not carry out any special action.

(4) A Cluster with Particularly Low Familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

FIG. 7 is a data structure diagram of a load table 170. Motions selected by the operation control unit 222 of the server 200 and the operation control unit 150 of the robot 100 have various processing loads. Herein, a processing load is a concept indicating a motion execution cost, and is defined by, for example, a number of unit motions included in one motion, a complexity of a motion, a number of actuators used for executing a motion, an operating amount of an actuator, a motion execution time, power consumption (energy) for executing a motion, and the like. A motion with a large processing load (hereafter called a "high-load motion") is often an energetic motion, and a motion with a small processing load (hereafter called a "low-load motion") is often a low-key motion.

Complex motions such as, for example, rotating while shaking the head or meandering at high speed are included as high-load motions. Simple motions such as, for example, nodding or sitting are included as low-load motions.

In this embodiment, an evaluation value (hereafter called a "load value") is set in advance within a range of 1 to 100 for the processing load of each motion. The load value may be set by a designer of the motion, or may be set based on an actual measurement value of power consumption or the like.

The load table 170 defines a correspondence relationship between a motion and a processing load (load value). The load table 170 is stored in both the motion storage unit 232 of the server 200 and the motion storage unit 160 of the robot 100. The operation control unit 222 and the like refer to the load table 170, and select a motion using a method to be described hereafter.

According to FIG. 7, the load value, that is, the evaluation value of the magnitude of the processing load, of a motion with motion ID=C01 (hereafter written as a "motion (C01)") is set at "20". Meanwhile, the load value of a motion (C02) is "10". This means that the motion (C01) requires twice the energy of the motion (C02). An amount of power consumed per unit time varies in accordance with which motion is selected.

FIG. 8 is a data structure diagram of a motion selection table 180.

The motion selection table 180 defines a motion to be executed when various kinds of event occur. When an event occurs, the robot 100 selects one or more motions from multiple kinds of motion. The motion selection table 180 is stored in both the motion storage unit 232 of the server 200 and the motion storage unit 160 of the robot 100. An "event" is defined in advance as a phenomenon that forms a trigger for the robot 100 to execute a motion. Details of an event are arbitrary, such as when visually recognizing an owner, when being hugged by an owner, when being kicked, or when not visually recognizing anyone for a predetermined time or longer.

When referring to FIG. 8, a selection probability is correlated to each of the motion (C01) to a motion (Cx) for an event J1. For example, when the event J1 occurs, the operation control unit 222 does not select the motion (C01), and selects the motion (C02) at a probability of 0.1%. When an event J2 occurs, the operation control unit 222 selects the motion (C01) at a probability of 0.1%, and selects the motion (C02) at a probability of 0.4%.

A selection probability in the motion selection table 180 is not a fixed value. The operation control unit 222 causes the selection probability to change as necessary in accordance with the remaining charge of the battery 118, or the like. When a selection probability of the motion selection table 180 is updated, the motion selection table 180 after updating is downloaded into the robot 100.

For example, the selection probability of the high-load motion (C01) may decrease by half when the remaining battery charge reaches 50% or less, and the selection probability of the motion (C01) may further decrease by half when the remaining battery charge reaches 30% or less. Meanwhile, the selection probability of the low-load motion (C04) may increase by 1.2 times when the remaining battery charge reaches 50% or less, and the selection probability thereof may further increase by 1.2 times when the remaining battery charge reaches 30% or less.

By refraining more from executing a high-load motion the lower the remaining battery charge becomes, the activity time of the robot 100 can be extended. Even when no special event is occurring, the operation control unit 222 may select a motion at a predetermined selection probability. In this case too, the operation control unit 222 causes the selection probability of the motion to change in accordance with the remaining battery charge. According to this kind of control method, behavioral characteristics such that the robot 100 is active when the remaining battery charge is large, and becomes quiet when the remaining battery charge becomes small, can be expressed.

The operation control unit 222 may select a high-load motion when the remaining battery charge is small. For example, the selection probability of the high-load motion (C01) may be temporarily increased by 3 times while an SOC is between 35 and 40%. This kind of control is such that, while being affected by the remaining battery charge, unexpected behavioral characteristics that do not depend only on the remaining battery charge can be expressed.

It is assumed that there are certain two motions, one thereof is a comparatively high-load motion, and the other is a comparatively low-load motion. It is assumed that the selection probability of the high-load motion is Y1, and the selection probability of the low-load motion is Y2. It is assumed that Y1/Y2=p. When the remaining battery charge drops to or below a certain threshold, p is desirably smaller compared with when the remaining battery charge is greater than the threshold. It is sufficient, at least in statistical terms, that when the remaining battery charge is small, the selection probability of the high-load motion decreases, or that the selection probability of the low-load motion rises, in comparison with when that is not the case.

An event such that the selection probability is not affected by the remaining battery charge (hereafter referred to as a priority event) may be defined. It is sufficient that a priority event is defined as an event such that an action is of high importance, such as an owner returning home or leaving home or a state of emergency such as a robber or a fire. A configuration may be such that when a priority event occurs, the operation control unit 222 need not cause the selection probability of one or more motions correlated to the priority event to change in accordance with the remaining battery charge, or may always execute a specific motion when the priority event occurs.

The selection probability of a motion may be changed in accordance with an absolute value of the remaining battery charge, but in this embodiment, the selection probability of a motion is changed in accordance with a value of a difference between consumption plan data and the remaining battery charge. Next, consumption plan data will be described.

Figures 9, 10:
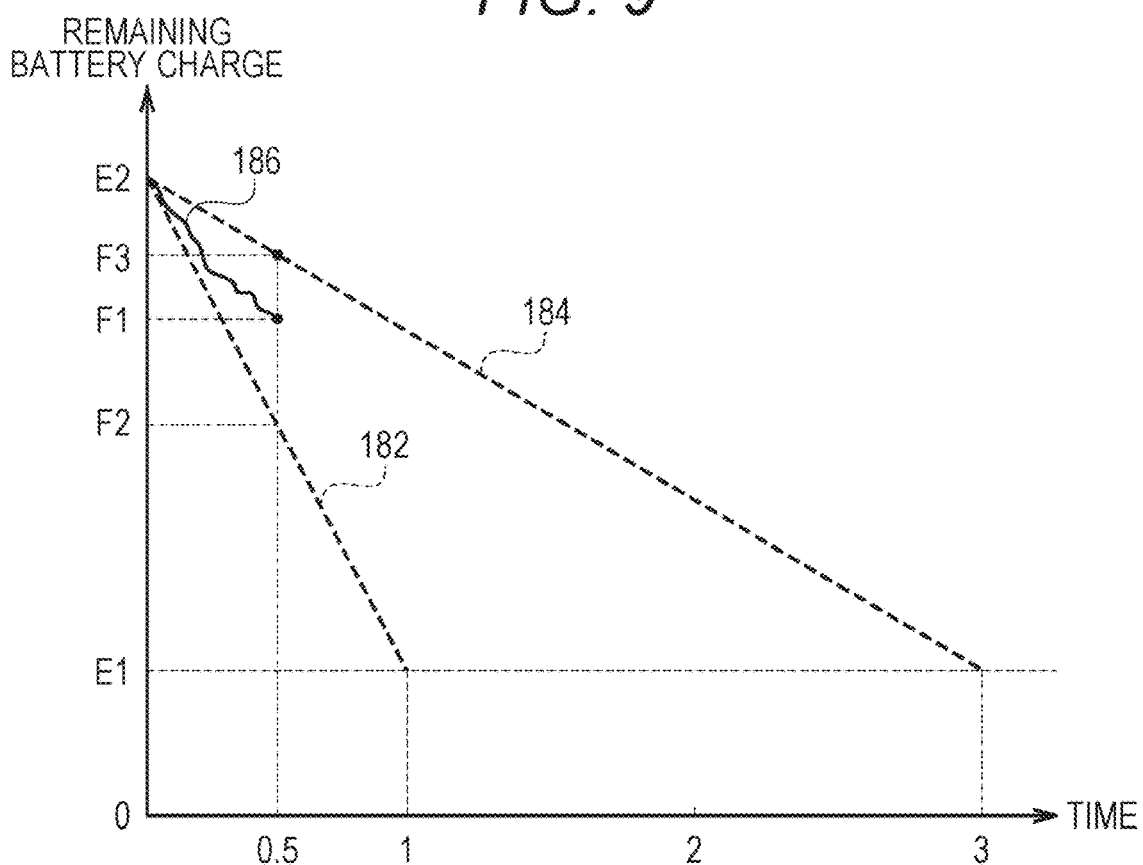
FIG. 9 is a schematic diagram showing a relationship between consumption plan data and motion selection.
FIG. 10 is a schematic diagram of a consumption plan selection table.

FIG. 9 is a schematic diagram showing a relationship between consumption plan data and motion selection.

As heretofore described, the plan setting unit 240 sets consumption plan data that establish a power consumption pace. When the remaining battery charge decreases to or below a lower limit value E1, the operation control unit 222 causes the robot 100 to move to a charger, and to be charged. When the remaining battery charge reaches an upper limit value E2 (>E1) or greater, the operation control unit 222 causes the robot 100 to move away from the charger. In this way, when the remaining charge of the battery 118 is within the range of E1 to E2, the robot 100 is active distanced from the charger. In other words, a period for which the remaining charge of the battery 118 is within the range of E1 to E2 is the activity time of the robot 100.

A one-hour plan 182 is a plan such that power is consumed from the upper limit value E2 to the lower limit value E1 in one hour after charging is completed. A three-hour plan 184 is a plan such that the power is consumed in three hours. The one-hour plan 182 is such that after charging is completed, the remaining battery charge 0.5 hours later is F2, and the remaining battery charge reaches the lower limit value E2 one hour later. The activity time of the robot 100 is one hour. Meanwhile, the three-hour plan 184 is such that after charging is completed, the remaining battery charge 0.5 hours later is F3 (>F2), and the remaining battery charge reaches the lower limit value E2 three hours later. The activity time of the robot 100 is three hours.

The power consumption pace does not need to be constant in the consumption plan. For example, the power consumption pace may be set to be low at first, and the power consumption pace may be raised partway through. A consumption plan selection reference will be described hereafter.

A remaining battery charge graph line 186 indicates an actual power consumption pace. When the one-hour plan 182 is being employed, the remaining battery charge graph line 186 is such that the power consumption pace is gentle when compared with the one-hour plan 182. In this case, the operation control unit 222 raises the selection probability of a high-load motion. For example, a difference between the scheduled value F2 of the remaining battery charge and an actual remaining battery charge value F1 0.5 hours after charging is completed is calculated, and when the value of the difference is equal to or greater than a predetermined threshold, the operation control unit 222 changes the selection probability of the high-load motion (C01) to be twice as high. Not being limited to the motion (C01), it is sufficient that the selection probability of a high-load motion is raised, and the selection probability of a low-load motion is reduced. Owing to this kind of setting change, a high-load motion becomes easy to select and a low-load motion becomes difficult to select, because of which the difference between the one-hour plan 182 and the remaining battery charge graph line 186 can be reduced. That is, power consumption in accordance with the one-hour plan 182 is realized by encouraging energetic behavior for the robot 100.

When the three-hour plan 184 is being employed, the remaining battery charge graph line 186 is such that the power consumption pace is too fast when compared with the three-hour plan 184. In this case, the operation control unit 222 reduces the selection probability of a high-load motion. A difference between the scheduled value F2 of the remaining battery charge and the actual remaining battery charge value F3 0.5 hours after charging is completed is calculated, and the operation control unit 222 may reduce the selection probability of the high-load motion (C01) by half in order to eliminate the difference of F3–F2. Not being limited to the motion (C01), it is sufficient that the selection probability of a high-load motion is reduced, and the selection probability of a low-load motion is raised. By this kind of setting change being carried out, a high-load motion becomes difficult to select and a low-load motion becomes easy to select. By restricting the activity amount of the robot 100, power consumption in accordance with the three-hour plan 184 is realized.

According to the heretofore described control method, energetic behavior is easily selected in exchange for the activity time of the robot 100 being short when the one-hour plan 182 is set, and when the three-hour plan 184 is set, the robot 100 becomes quiet but the activity time increases. Consequently, activity of the robot 100 can be controlled in accordance with a selection of consumption plan data. Also, there is also an advantage in that power consumption of the robot 100 can be managed using consumption plan data.

FIG. 10 is a schematic diagram of a consumption plan selection table 188.

The activity monitoring unit 242 records the operation history of the robot 100. Further, the activity monitoring unit 242 calculates an activity amount per unit time. For example, when the motion (C01), the motion (C02), and the motion (C03) are executed in a certain unit time, a total load value in this time is 33 (=20+10+3: refer to FIG. 7). The consumption plan selection table 188 defines a total load value as an "activity amount", and sets a correspondence between the activity amount and consumption plan data.

According to the consumption plan selection table 188, the plan setting unit 240 selects a consumption plan (D01) when the activity amount is 200 or greater, and when the activity amount is 160 or greater and less than 200, the plan setting unit 240 selects a consumption plan (D02). For example, when charging is completed at 3.10 p.m., the plan setting unit 240 obtains an average value of the activity amount from 3.10 p.m. to 4.10 p.m. from a past operation history. Then, when the average activity amount for the one hour from 3.10 p.m. to 4.10 p.m. for the past 10 days is 155, the plan setting unit 240 selects a consumption plan (D03).

For a time band in which the activity amount is large, the plan setting unit 240 sets consumption plan data such that the activity time is short in exchange for the activity amount being large, and for a time band in which the activity amount is small, the plan setting unit 240 sets consumption plan data such that the activity time is long in exchange for the activity amount being small. In the case of FIG. 10, the consumption plan (D01) has the shortest activity time, and a consumption plan (D07) has the longest activity time.

When a consumption plan with a short activity time is selected, the robot 100 behaves energetically. Also, the more the robot 100 interacts with an owner, the more the activity amount is liable to increase. This is because various events are set corresponding to responsive actions by an owner. The more frequently an event occurs, the greater the number of motion selections. In particular, the robot 100 reacts in a large variety of ways to a positive interaction such as contact with the robot 100.

The robot 100 behaves energetically when an owner is present, and particularly when a large number of owners are present, and in a time band in which there is a large activity amount, consumption plan data responding thereto are selected. Also, consumption plan data such that the power consumption pace is gentle are selected in a time band in which there is a small activity amount. The robot 100 becomes quiet in a time band in which nobody is watching the robot 100, and in a time band in which nobody is actively involved with the robot 100, and the robot 100 behaves energetically, bringing enjoyment to the owners, in a time band in which the robot 100 attracts attention.

The robot 100 restricting activity in a time band in which the robot 100 does not attract attention is thoughtful behavior in terms of not getting in the way of an owner, and also contributes to power saving. The robot 100 selects various motions in response to events such as visually recognizing an owner, contact, and being spoken to. When the recognizing unit 156 of the robot 100 detects a moving object such as an owner or a pet, the selection probability of an energetic motion, or in other words, a high-load motion, is raised, and the selection probability of a low-load motion is reduced. It is sufficient that a setting change is carried out so that of at least two motions, the ratio of the selection probability of a high-load motion with respect to the selection probability of a low-load motion increases.

The activity amount may be calculated from the load value of each motion, or may be calculated from an amount of power consumed per unit time.

Although an activity amount and a consumption plan are correlated in the consumption plan selection table 188, a time band and a consumption plan may also be correlated. According to this kind of setting method, for example, an activity amount in a time band such that the robot 100 is quiet in the morning and energetic at night can be controlled using the consumption plan selection table 188. Also, the operation control unit 222 may set a charging timing, such as always charging in the middle of the night.

Figure 11:
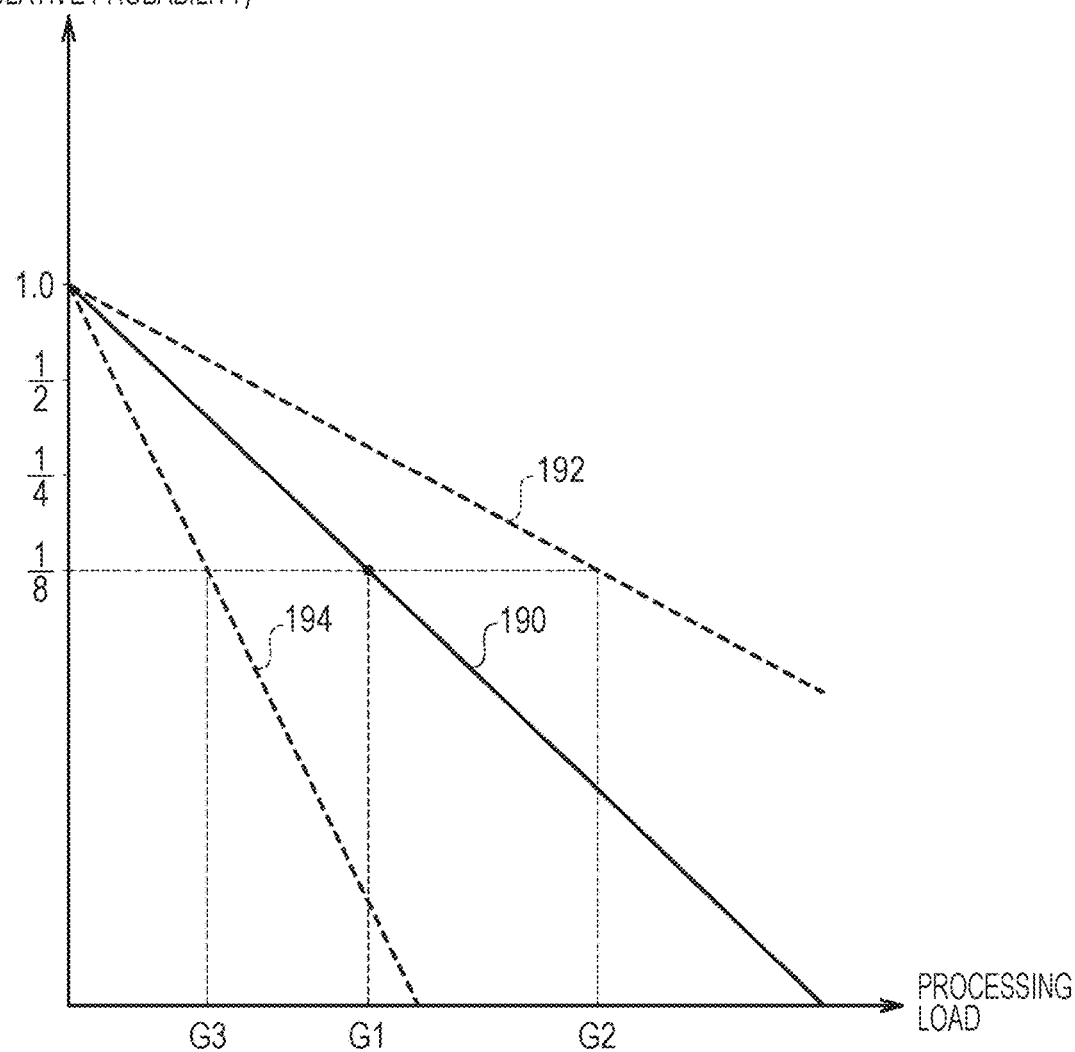
FIG. 11 is a schematic diagram showing a relationship between processing load and selection probability.

FIG. 11 is a schematic diagram showing a relationship between processing load and selection probability.

Non-patent Document 1 reveals that a result of measuring human activity using a wearable sensor shows that there is a statistical regularity to human behavior selection (refer to P27 of Non-patent Document 1). Measuring a number of physical movements of a human per minute shows that there is a large amount of time in which movement is calm, such as 50 times/minute, and an extremely small amount of time in which violent movement is performed. Further, it is said that a stable relationship between violence of movement and a probability of selecting such a movement is found. A human thinks that he or she is deciding on his or her own behavior freely by his or her own will or thinking, but there is a strange regularity to an accumulation of the behavior selections. It might be that behavioral characteristics that accord with this kind of regularity can be said to be "animal-like behavioral characteristics".

By this kind of regularity being applied to motion selection, the behavioral characteristics of the robot 100 in this embodiment are rendered still more "animal-like".

In FIG. 7, a vertical axis is a logarithmic axis, and shows an accumulative selection probability. A horizontal axis is a processing load of each motion. A basic activity graph line 190 indicates a relationship between a motion and the selection probability (accumulative probability) thereof. According to the basic activity graph line 190, a time band in which a motion with a processing load of G1 or greater is executed is shown to be ⅛ of one day. In other words, only a motion with a processing load of less than G1 is selected for ⅞ of one day. Expressed simply, a high-load motion is unlikely to be selected, and a low-load motion is likely to be selected.

As heretofore described, the operation control unit 222 selects a motion of the robot 100 in response to various events. Which of a multiple of motions is to be selected is determined in accordance with the motion selection table 180. A selection probability in the motion selection table 180 is not a fixed value. The operation control unit 222 changes a selection probability in the motion selection table 180 as appropriate in accordance with the remaining battery charge, or more precisely, in accordance with a result of comparing the remaining battery charge and the consumption plan. When the actual remaining battery charge and the scheduled value in the consumption plan are distanced, the operation control unit 222 changes the selection probability in order to eliminate the distance. Furthermore, the change method accords with the regularity of the basic activity graph line 190 shown in FIG. 11.

For example, when there is more leeway in the remaining battery charge than in the scheduled value of the consumption plan, the operation control unit 222 increases the selection probability of a high-load motion, or in other words, an energetic motion. At this time, the operation control unit 222 changes a selection from the basic activity graph line 190 to a high activity graph line 192, and changes the selection probability of each motion so as to correspond to the high activity graph line 192. The high activity graph line 192 is also such that linearity is maintained, because of which animal-like and natural behavioral characteristics can be maintained. In the high activity graph line 192, a time band in which a motion with a processing load of G2 (>G1) or greater is executed is ⅛ of one day. The activity amount increases compared with that of the basic activity graph line 190.

Meanwhile, when the remaining battery charge is less than the scheduled value of the consumption plan, the operation control unit 222 reduces the selection probability of a high-load motion. The operation control unit 222 changes a setting from the basic activity graph line 190 to a low activity graph line 194, and changes the selection probability of each motion so as to correspond to the low activity graph line 194. In the low activity graph line 194, a time band in which a motion with a processing load of G3 (<G1) or greater is executed is ⅛ of one day. The activity amount decreases compared with that of the basic activity graph line 190.

The activity monitoring unit 242 refers to the operation history, and counts which events are occurring how many times a day. The activity monitoring unit 242 calculates by simulation a number of times each motion is selected per day, based on a probability of each event occurring and the selection probability of each motion correlated to the event. For example, it is assumed that an event A occurs an average of 10 times per day, and an event B occurs an average of 7 times per day. It is assumed that the selection probability of a motion X responding to the event A is 5%, and the selection probability of the motion X responding to the event B is 10%. In this case, the number of selections per day of the motion X is 1.2 (=10×0.05+7×0.10) times. The number of selections of each motion is calculated in the same way.

Next, the number of selections of each motion and the basic activity graph line 190 are compared, and the selection probability of each motion is obtained, using an already known optimization method such as the Monte Carlo method, so as to obtain a selection probability distribution that coincides with the basic activity graph line 190. In the same way, selection probability distributions corresponding to the high activity graph line 192 and the low activity graph line 194 are set. It is sufficient that selection probability sets of motion groups corresponding to the basic activity graph line 190, the high activity graph line 192, and the low activity graph line 194 are prepared in advance, and the basic activity graph line 190, the high activity graph line 192, or the low activity graph line 194 is selected while comparing the consumption plan and the remaining battery charge.

According to the heretofore described control method, motion selection based on the animal-like regularity shown in FIG. 11 and motion selection based on the consumption plan can be balanced.

Figure 12:
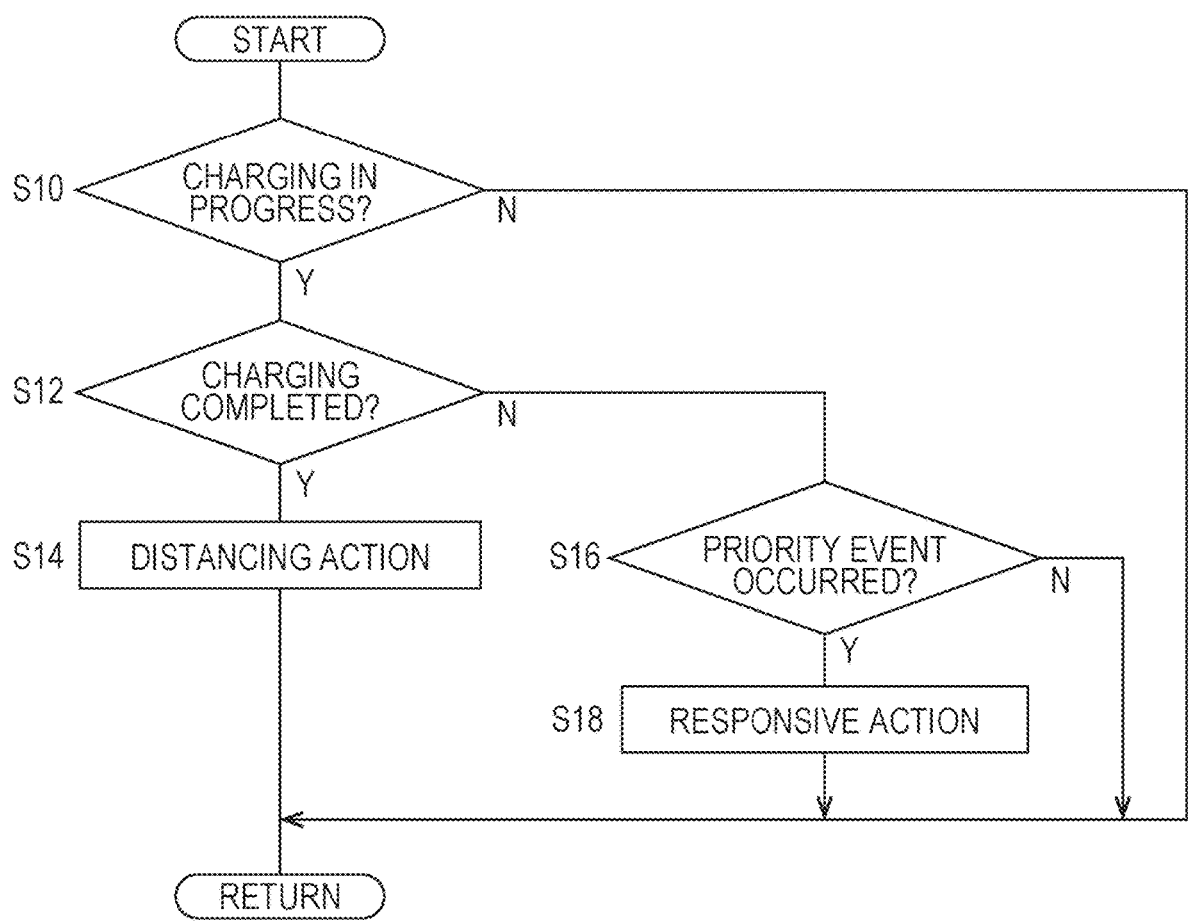
FIG. 12 is a flowchart showing a process when a priority event occurs during charging.

FIG. 12 is a flowchart showing a process when a priority event occurs during charging.

When charging is not in progress (N of S10), a subsequent process is skipped. When charging is in progress (Y of S10) and the charging is completed (Y of S12), the operation control unit 222 causes the robot 100 to move away from the charger (S14). Charging being completed is when the remaining battery charge exceeds the upper limit value E2 (refer to FIG. 9).

When a priority event occurs (Y of S16) when charging is not completed (N of S12), the robot 100 selects a motion correlated to the priority event (S18). Meanwhile, when no event is occurring, or when an event that occurs is not a priority event (N of S16), charging is continued.

As heretofore described, a priority event is an important event such as an owner returning home or leaving home. When the external sensor 114 installed in a hall detects a person in a monitoring area of the external sensor 114, the robot 100 moves to the hall and performs a greeting. Having once entered a charging mode, the robot 100 does not move, but when an important phenomenon such as an owner returning home occurs, the robot 100 executes a greeting action even though charging is not completed.

When a priority event occurs, the operation control unit 222 carries out a selection of a motion responding to the priority event, regardless of whether charging is in progress or not, or whether the remaining battery charge is large or small. Behavioral characteristics that respond precisely to the priority event are realized, without being excessively regulated by the remaining battery charge.

Even when a return home is detected, whether or not this is to be seen as a priority event may be determined in accordance with the familiarity of the person detected. For example, when an owner with a familiarity of a predetermined threshold or greater returns home, the operation control unit 222 sees this as a priority event, and issues an instruction for a greeting action. Meanwhile, when an owner with a familiarity of less than the predetermined threshold returns home, the operation control unit 222 need not see this as a priority event.

Hereafter, the robot 100 and the robot system 300 including the robot 100 will be described, based on an embodiment.

The robot 100 performs an action selection that cannot be patterned using one or more action maps, and which is difficult to predict and animal-like.

In the same way as a living creature, the behavior of the robot 100 changes in accordance with not only an action map, but also various kinds of event. According to this embodiment, the robot 100 acts energetically when the remaining battery charge is large. Meanwhile, the robot 100 becomes quiet when the remaining battery charge decreases. Because of this, behavior indicating that the remaining battery charge forms a source of vitality of the robot 100 can be expressed. An impression close to that of sleeping or eating can be given to the mechanical process of charging.

By the activity amount of the robot 100 being controlled in accordance with the consumption plan data, a time band in which the robot 100 is to be active and a time band in which the robot 100 is to be quiet can be controlled. This also contributes to saving power of the robot 100.

Sleeping and eating are necessary in order for a human to move. When an important phenomenon occurs, a human acts even when sleeping or eating, or even when tired due to a lack of sleep. Charging is important in order for the robot 100 to move. The robot 100 in this embodiment also acts when a priority event occurs, even when being charged, or even when the remaining battery charge is slight. According to this kind of control, the robot 100 can have flexibility in behavior that is not too regulated by the remaining battery charge.

When interacting with an owner, the robot 100 frequently executes various motions, because of which power consumption also increases. When the power consumption pace is faster than in the consumption plan, it is difficult for the robot 100 to select a high-load motion. Because of this, the robot 100 is energetic when with a person, but the robot 100 swiftly becomes quiet when the person subsequently departs. Being happy when playing with a person, but becoming tired when playing too much, can be expressed by behavior.

The activity monitoring unit 242 recording the operation history of the robot 100 is also effective when seeing a lifestyle pattern of the robot 100. For example, when seeing information such as being quiet in the evening and moving energetically on Saturdays, there is an advantage in that a person's lifestyle pattern can be reconfirmed via the robot 100.

The invention not being limited to the heretofore described embodiment or a modified example, components can be changed or embodied without departing from the scope of the invention. Various inventions may be formed by a multiple of the components disclosed in the heretofore described embodiment or the modified example being combined as appropriate. Also, some components may be eliminated from the total of components shown in the heretofore described embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

In this embodiment, a motion of the robot 100 is selected based on the load table 170. In addition to this, a configuration may be such that a specific motion is selected only when the remaining battery charge is within a predetermined range, or conversely, a configuration may be such that a specific motion is not a target of selection.

As a method of changing a motion selection algorithm, the processing load of the motion may be caused to change by replacing or eliminating one portion of the unit motions configuring the motion. In this embodiment, the motion processing load is fixed, and motion selection corresponding to the remaining battery charge or the like is carried out by causing the motion selection probability to change. The motion processing load may be changed with the motion selection probability remaining fixed. For example, it is sufficient that the motion processing load is caused to change by a unit motion being added or eliminated. A motion interval may be adjusted, or actuator speed may be adjusted. There is a case in which the processing load can be reduced when actuator speed is reduced.

According to this kind of control method, behavioral characteristics such that a low-charge motion is more likely to be executed, and a high-load motion is less likely to be executed, the smaller the remaining battery charge becomes can be realized.

The robot 100 becomes quiet when the remaining battery charge becomes smaller than in the consumption plan, but conversely, the activity amount of the robot 100 may be temporarily raised even when the remaining battery charge becomes small. In this way, unexpectedness of behavior of the robot 100 may be secured without being excessively regulated by the remaining battery charge.

In addition to the activity amount and the time band, the consumption plan may be changed based on the time of year, whether the day is a holiday or a weekday, the air temperature, the weather, and the like.

When nobody is present, the robot 100 may be charged even when the remaining battery charge has not reached the lower limit value E1. By actively charging when nobody is watching, adjustment may be carried out so that a time of activity and a time when the robot 100 is with somebody coincide.

The basic activity graph line 190 may be set for each robot 100. A configuration may be such that the high activity graph line 192 is likely to be selected for the robot 100 that is in a lively home, and the robot 100 is likely to be set to the low activity graph line 194 in a quiet home. The behavioral characteristics of the robot 100 can be provided with individuality by the basic activity graph line 190 being caused to change for each robot 100.

By utilizing the operation history, a future activity amount of the robot 100 can be predicted. For example, even when the remaining battery charge becomes smaller than in the consumption plan, there is a possibility that the consumption plan can be adhered to without restricting the activity amount when in a time band in which an event is unlikely to occur. In this way, the operation control unit 222 may select a motion based on the remaining battery charge and a predicted future value of the consumption plan.

When called by an owner, the robot 100 heads toward the owner when the remaining battery charge is equal to or greater than a threshold E3. A configuration may be such that when the remaining battery charge is less than the threshold E3 but equal to or greater than a threshold E4 (<E3), the robot 100 does not respond to a first call, but responds to a second call. A configuration may be such that when the remaining battery charge is less than the threshold E4 but equal to or greater than a threshold E5 (<E4), the robot 100 only responds when called in a loud voice. In this way, behavioral characteristics such that behavior becomes more sluggish when the remaining battery charge decreases are also conceivable. The thresholds E3, E4, and E5 may be set in accordance with the familiarity of an owner.

In the same way, the smaller the remaining battery charge becomes, the further the actuator operating amount may be lowered, or the further sensitivity with respect to an action map may decrease.

In this embodiment, a description has been given with the robot 100 that moves on the front wheel 102 and the rear wheel 103 as a subject, but the invention is also applicable to a walking robot, such as a robot that walks on two legs or a robot that walks on four legs. In particular, the value of applying the invention is particularly high for a robot that has a large number of actuators and moves in many ways.

Figure 13:
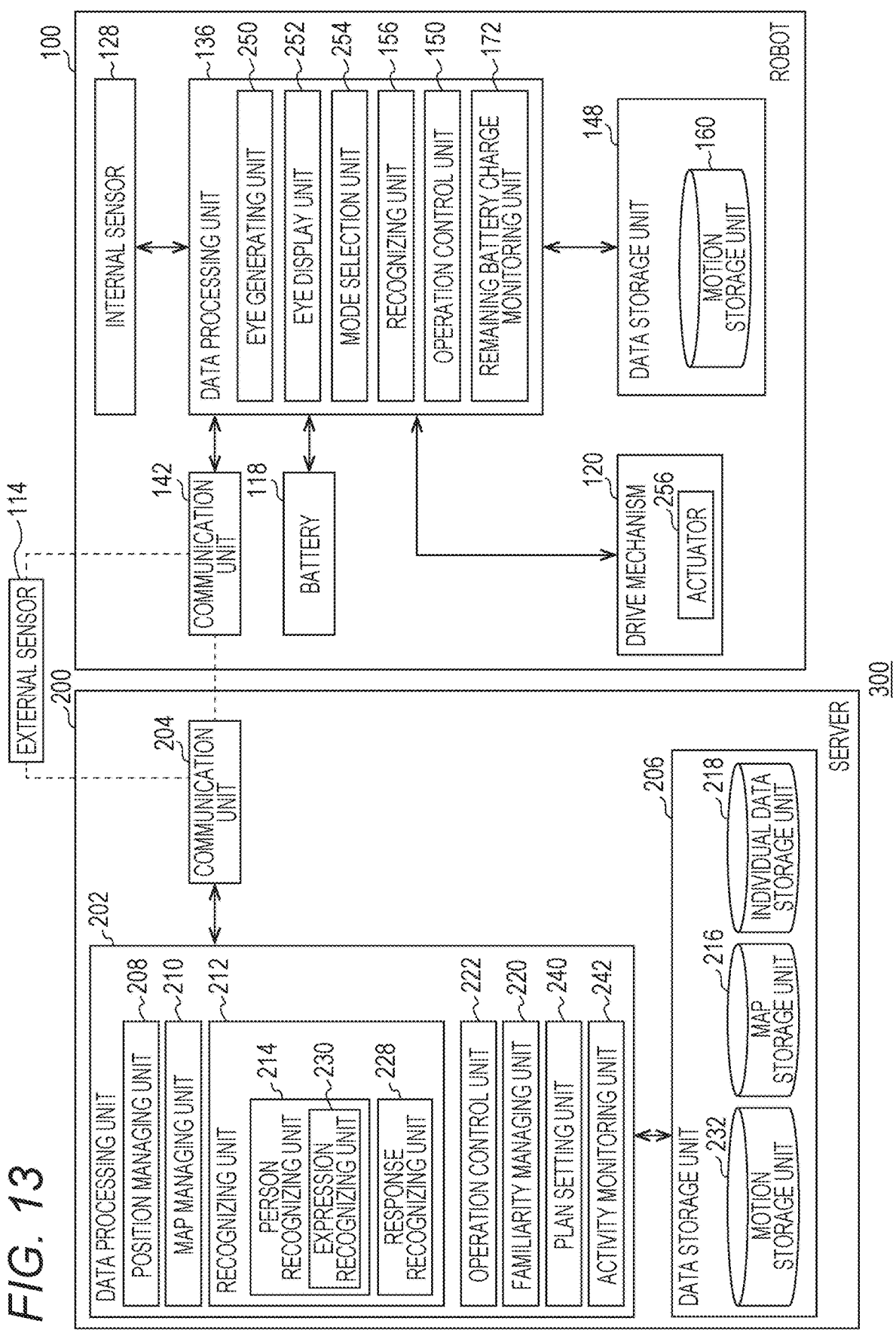
FIG. 13 is a functional block diagram of the robot system in a first modified example.

Operating Mode FIG. 13 is a functional block diagram of the robot system 300 in a first modified example.

In the robot system 300 of the first modified example, the data processing unit 136 includes an eye generating unit 250, an eye display unit 252, and a mode selection unit 254 in addition to the operation control unit 150, the recognizing unit 156, and the remaining battery charge monitoring unit 172. The eye generating unit 250 generates an eye image (to be described hereafter). The eye display unit 252 causes an eye image to be displayed in the eye 110. The mode selection unit 254 selects an "operating mode" of the robot 100. Operating modes will be described hereafter. Also, the drive mechanism 120 includes various kinds of actuator 256. Herein, the actuator 256 is a collective term for the various kinds of actuator described in connection with FIG. 2 and the like. The operation control unit 150 transmits an actuating signal to the actuator 256, thereby driving the actuator 256. Rotation of the actuator 256, or a direction, speed, and amount of movement, are specified by the actuating signal.

Figure 14:
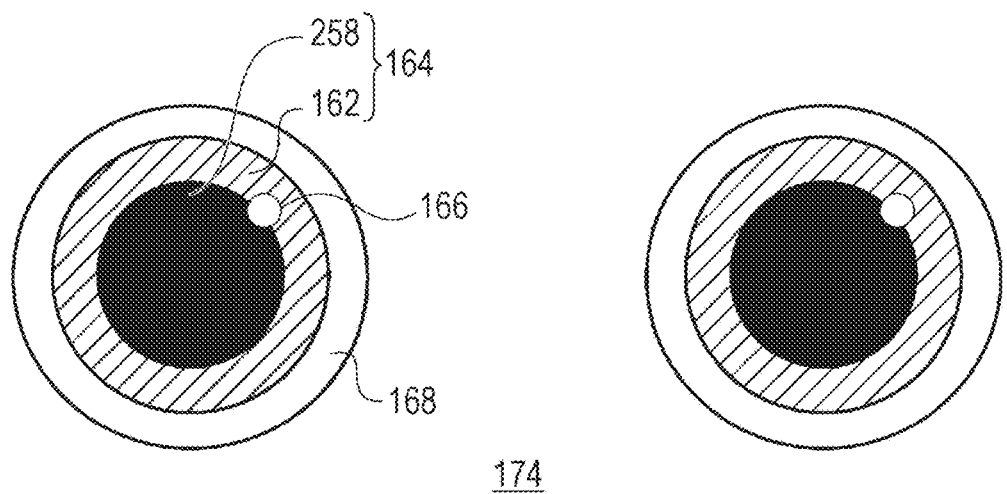
FIG. 14 is an external view of an eye image.

FIG. 14 is an external view of the eye image 174.

The eye 110 of the robot 100 is formed as a display on which the eye image 174 is displayed. The eye generating unit 250 generates the eye image 174 to include a pupil image 164 and a periphery image 168. The eye generating unit 250 also displays the eye image 174 as a moving image. Specifically, the eye generating unit 250 represents a line of sight of the robot 100 by moving the pupil image 164. Also, a blinking operation is executed at a predetermined timing. The eye generating unit 250 represents a large variety of movements of the eye image 174 in accordance with various operation patterns. The eye display unit 252 causes the generated eye image 174 to be displayed on a monitor of the eye 110. The monitor desirably has a curved form, in the same way as a human eyeball.

The pupil image 164 includes a pupillary region 258 and a corneal region 162. Also, a catch light 166 for expressing a reflection of external light is also displayed in the pupil image 164. Rather than shining owing to a reflection of external light, the catch light 166 of the eye image 174 is an image region expressed as a high-luminance region by the eye generating unit 250.

The eye generating unit 250 can move the pupil image 164 vertically and horizontally on the monitor. When the recognizing unit 156 of the robot 100 recognizes a moving object, the eye generating unit 250 generates an operation pattern (moving image data) such that orients the pupil image 164 in a direction in which the moving object exists. The eye display unit 252 expresses a "gaze" of the robot 100 by causing the display of the eye image 174 to change in accordance with the operation pattern.

The eye generating unit 250 not only moves the pupil image 164 relative to the periphery image 168, but can also represent a half-closed eye or a closed eye by causing an eyelid image to be displayed. The eye generating unit 250 may represent an aspect of the robot 100 sleeping by displaying a closed eye using the eyelid image, or may represent the robot 100 being in a half-asleep state, that is, a state of nodding off to sleep, by covering three-quarters of the load table 170 with the eyelid image, then shaking the eyelid image.

Figure 15:
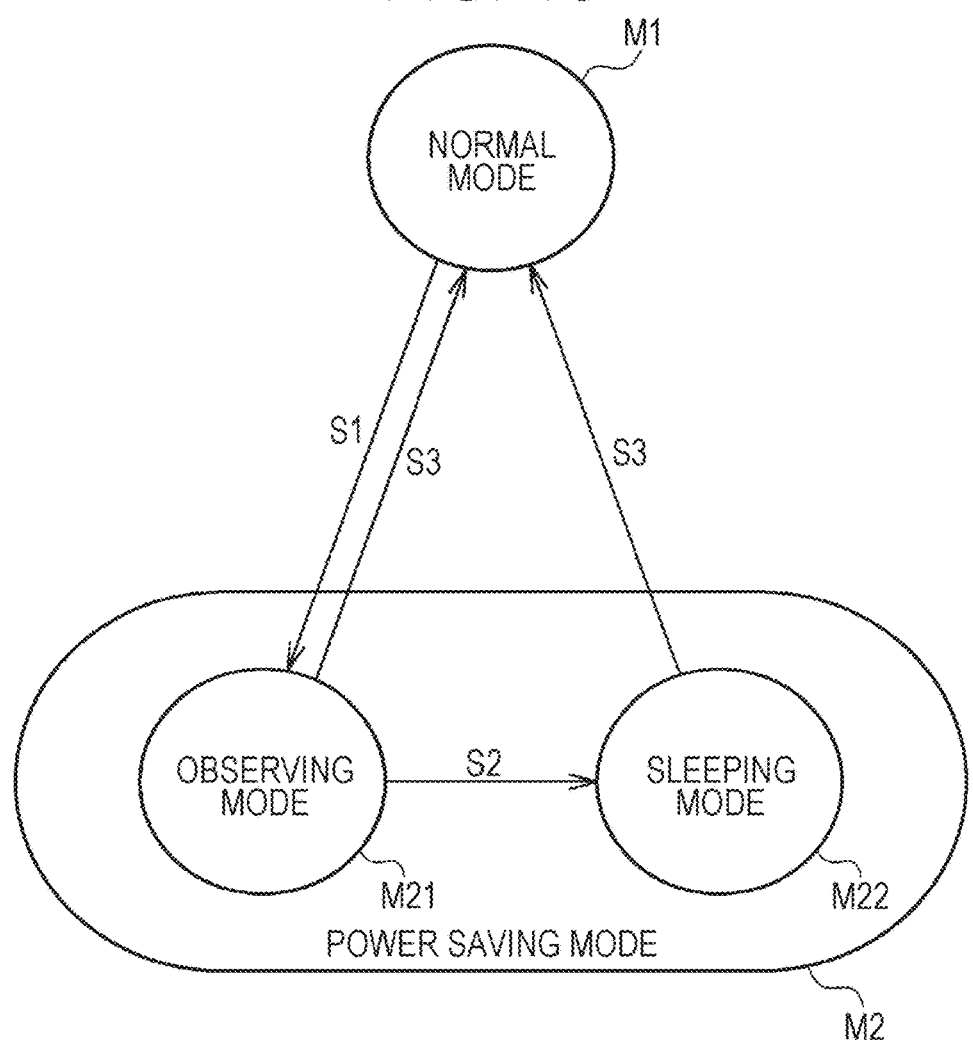
FIG. 15 is an operating mode transition diagram.

FIG. 15 is an operating mode transition diagram.

Operating modes are broadly divided into a "normal mode M1" and a "power saving mode M2". The power saving mode M2 further includes an "observing mode M21 (a first mode)" and a "sleeping mode M22 (a second mode)". The power saving mode M2 is an operating mode such that power consumption is restricted more than in the normal mode M1. Because of this, the activity amount of the robot 100 is restricted more when in the power saving mode M2 than when in the normal mode M1, and the robot 100 is quieter. The operation control unit 150 may limit a supply of power to the actuator 256 more in the power saving mode M2 than when in the normal mode M1. The operation control unit 150 may limit the kinds or number of actuators 256 that form control targets in the power saving mode M2, or may set the interval (heretofore described) connecting unit motions to be longer than when in the normal mode M1. The operation control unit 150 may refer to the load table 170, and eliminate a motion with a processing load (load value) of a predetermined value or greater, or in other words, a motion with a large power consumption, as a selection target. The operation control unit 150 may provide a limit to the speed of movement of the robot 100 in the power saving mode M2.

Hereafter, a description will be given assuming that the robot 100 can move in the normal mode M1, but that the robot 100 cannot move in the power saving mode M2.

The eye generating unit 250 can cause the eye image 174 to change in the observing mode M21 of the power saving mode M2. Also, the operation control unit 150 can drive the head portion frame 316 (neck) in the observing mode M21. However, the operation control unit 150 cannot cause the robot 100 to travel by driving the front wheel 102. Although the robot 100 does not move in the observing mode M21, the robot 100 adopts a behavioral aspect of gazing at a moving object such as a person, another robot 100, or a pet, or in other words, a behavioral aspect of not moving, but monitoring and observing a periphery. The observing mode M21 corresponds to "a state of being awake but resting".

The eye generating unit 250 closes the eyelid, causing the eye image 174 that appears to be sleeping to be displayed, in the sleeping mode M22 of the power saving mode M2. The operation control unit 150 stops the operation of all the actuators 256. As heretofore described, the supply of power to the processor 122 may be stopped in the sleeping mode M22, but the supply of power to the monitor of the eye 110 is maintained. The sleeping mode M22 corresponds to a "sleeping state".

As the operation of the robot 100 is stopped in the power saving mode M2 of the first modified example, power consumption is restricted in comparison with the normal mode M1. As the operation of all the actuators 256 is stopped in the sleeping mode M22, power consumption is restricted even further than in the observing mode M21. In the first modified example, the operation control unit 150 causes the processor 122 to be suspended in the sleeping mode M22. Specifically, not only is a clock of the processor 122 stopped, but the supply of power to the processor 122 also stops. An execution state of the processor 122 is saved in the memory, and the supply of power to the memory (storage device 124) is maintained. "Suspending" in this case is the same as a suspension method executed in a general personal computer. Suspension and return from suspension may be realized using a control circuit independent of the processor 122.

This kind of control method is such that when the robot 100 shifts from an active state (the normal mode M1) to a quiet state (the observing mode M21), and furthermore, reaches a state of appearing to be sleeping (the sleeping mode M22), a hardware (electronic circuit) activity level can also be lowered in conjunction. In other words, when the hardware activity level is lowered, an expression of behavior such that a consciousness level of the robot 100 appears to be dropping can be realized. In another modified example, a motion that expresses a state of nodding off to sleep may be carried out between leaving the observing mode M21 and reaching the sleeping mode M22.

When a "first transition condition" is satisfied in the normal mode M1, the mode selection unit 254 changes the operating mode from the normal mode M1 to the observing mode M21 (S1). It is sufficient that the first transition condition is defined arbitrarily. For example, the first transition condition may be seen to be satisfied when the amount of power consumed per unit time reaches a predetermined threshold or greater, when the remaining charge of the battery 118 (rechargeable battery) reaches a predetermined threshold or less, or when a state in which the recognizing unit 156 does not detect a moving object (a person, a pet, or another robot 100) in a periphery, using a sensing instrument such as the camera, continues for a first time T1 or longer.

When a "second transition condition" is satisfied in the observing mode M21, the mode selection unit 254 changes the operating mode from the observing mode M21 to the sleeping mode M22 (S2). It is sufficient that the second transition condition is also defined arbitrarily. For example, the second transition condition may be seen to be satisfied when the remaining charge of the battery 118 (rechargeable battery) reaches a predetermined threshold or less, when a predetermined time or longer elapses after shifting the state to the observing mode M21, or when a state in which the recognizing unit 156 does not detect a moving object continues for a second time T2 (>T1) or longer.

When a "return event" occurs in the power saving mode M2, the mode selection unit 254 changes the operating mode from the power saving mode M2 to the normal mode M1 (S3). Two kinds of return event, those being a "first return event" and a "second return event", are defined. When a first return event occurs, the mode selection unit 254 causes the operating mode to return from the power saving mode M2 to the normal mode M1 in the case of both the observing mode M21 and the sleeping mode M22. When a second return event occurs when in the observing mode M21, the mode selection unit 254 causes the operating mode to return from the power saving mode M2 (observing mode M21) to the normal mode M1. However, when a second return event occurs when in the sleeping mode M22, the mode selection unit 254 does not change the operating mode.

A first return event is defined as a phenomenon that causes the "sleeping (corresponding to the sleeping mode M22)" robot 100 to "awake (corresponding to the normal mode M1)". Specifically, a first return event may be seen to have occurred when there is detection of speech of a first volume V1 or greater, or detection of a touch on the robot 100.

A second return event is defined as a phenomenon that causes the "observing (corresponding to the observing mode M21)" robot 100 to return to a normal state (corresponding to the normal mode M1), but is not sufficient to cause the "sleeping (corresponding to the sleeping mode M22)" robot 100 to awake. That is, a second return event is desirably defined as a phenomenon whose effect on the "senses" of the robot 100 is small in comparison with that of a first return event. Specifically, a second return event may be seen to have occurred when there is detection of speech that is of a second volume V2 (≤V1) or greater and less than the first volume V1, or detection of a moving object by the recognizing unit 156. Also, in addition to a sense of sight, a sense of hearing, and a sense of touch, detection of a smell or a temperature change may be defined as a return event. In all cases, it is sufficient that a return event is a phenomenon that occurs in the external environment of the robot 100, and that can be detected by a sensor corresponding to the sense of sight, the sense of hearing, the sense of touch, or a sense of smell of the robot 100.

A dedicated motion (hereafter called a "start-up motion") is correlated to each of multiple kinds of return event. When a first return event X1 occurs in the sleeping mode M22, the operation control unit 150 executes a start-up motion Y1 correlated to the first return event X1. For example, when a first return event of "being spoken to from behind" occurs, the operation control unit 150 may perform a behavioral expression of "being surprised at being spoken to suddenly" by executing a start-up motion causing the front wheel 102 of the robot 100 to move vertically. In the same way, various kinds of start-up motion are defined for a second return event.

In addition to this, standing from a sitting state by putting out the front wheel 102, causing the body 104 to shake, changing an orientation to a direction in which a return event has occurred by causing the head portion frame 316 or the body 104 to rotate, causing the eye image 174 to blink, causing the arm 106 to wave, and the like, are conceivable as start-up motions.

It is not necessary that a return event and a start-up motion are fixedly correlated as a pair. As shown in the motion selection table 180 of FIG. 8, a multiple of start-up motions are correlated to one return event, and the operation control unit 150 may select a start-up motion in accordance with a selection probability. A large variety of behavioral expressions such as, for example, approaching because of being spoken to when observing a periphery, being surprised and running away because of being awoken by a loud voice when sleeping, or pretending not to notice despite being spoken to when in the observing mode M2, can be performed by diversifying return events and start-up motions.

Operation Restriction

When the remaining charge of the battery 118 reaches a reference value or lower, the operation control unit 150 restricts the operation of the actuator 256 of each portion (hereafter called "operation restriction"). Specifically, operation restriction may be a setting of a limit value for an operating range (for example, a possible angle of rotation) and an operating speed of the actuator 256. Operation restriction may be a limiting of the number or kinds of the actuator 256 that can operate among the multiple of actuators 256, or may be a lengthening of the interval connecting unit motions compared with a normal time. The operating amount of the actuator 256, or in other words the output of the actuator 256, may be restricted, or the power supplied to the actuator 256, or in other words the input of the actuator 256, may be restricted. Operation restriction may also be a changing of the operating mode from the normal mode M1 to the power saving mode M2 (observing mode M21).

When the remaining battery charge reaches a predetermined value, less than 30% for example, the operation control unit 150 may lower the total amount of power supplied to the actuator 256 per certain time. When the remaining battery charge becomes less than 30%, the operation control unit 150 may restrict power consumption by changing the consumption plan data from the one-hour plan 182 to the three-hour plan 184, thereby expressing a quieting down of the movement of the robot 100. The operation control unit 150 may provide an operating limit for each actuator. For example, drag accompanying a transformation of the outer skin 314 is generated when bending the neck, because of which the drag increases as an angle at which the neck is bent increases, and a large power consumption is needed. Empirically, drag increases sharply with a certain angle as a boundary. Taking this boundary as an operation angle threshold, power consumption may be restricted by controlling so that the neck is not bent to the threshold or beyond when restricting operation.

When the amount of consumption per unit time of the remaining battery charge is equal to or greater than a predetermined threshold, the operation control unit 150 may restrict the operation of the actuator 256. According to this kind of control method, behavior of being tired and becoming quiet as a reaction to moving energetically for a short time can be expressed. In addition to this, the operation of one or more actuators 256 may be restricted for the same reason when the operating times per unit time of all actuators 256 exceed a predetermined threshold, when a distance moved per unit time by the robot 100 exceeds a predetermined threshold, or when an energization time of the actuator 256 exceeds a predetermined time.

The further the remaining battery charge decreases, the more strongly the operation control unit 150 may restrict the operation of the actuator 256. For example, the operation control unit 150 may restrict the angle through which a certain one of the actuators 256 can rotate from 180 degrees to 150 degrees when the charge ratio (remaining battery charge) becomes less than 50%, and restrict the angle to 100 degrees when the charge ratio becomes less than 30%. By applying this kind of restriction, behavior wherein "sharpness" of movement of the robot 100 diminishes further the further the remaining battery charge decreases can be expressed.

When restricting operation, the operation control unit 150 may restrict operation with priority from an actuator with large power consumption. An actuator 379 that moves the front wheel 102 has a larger power consumption than an actuator 326 that moves the neck. Meanwhile, an actuator (not shown) that moves the arm 106 has a smaller power consumption than the actuator 326. When the remaining battery charge decreases, the operation control unit 150, firstly, may restrict the operation of, or stop, the actuator 379, and subsequently restrict the operation of, or stop, the actuator 326, thereby realizing a phased operation restriction.

When the remaining battery charge becomes smaller than a predetermined value, the operation control unit 150 lowers the total amount of power (an upper limit value) supplied to each actuator 256. By distributing designated power to each actuator 256, the operation control unit 150 controls each actuator 256 in a state in which the total amount is regulated.

The robot 100 expresses by behavior an emotion or consciousness of the robot 100 by controlling the multiple of actuators 256. A certain kind of emotion can be expressed by changing a magnitude or a speed of a gesture. For example, when "pleasure" is expressed by behavior on a daily basis by "turning round and round", "shaking the head to the left and right", and "waving the arm", it might be that "turning round and round" and "shaking the head to the left and right" can convey pleasure even without "waving the arm". That is, an emotion can be expressed even when one portion of movements configuring a movement differs from normal, or is missing.

"Pleasure" is expressed by an operation of "turning round and round", an operation of "waving the arm", and an operation of "shaking the neck portion to the left and right" being executed simultaneously. When the remaining battery charge decreases, the supply of power to the actuator that drives the arm is stopped, eliminating the operation of "waving the arm", and "pleasure" can be expressed even using only the operation of "turning round and round" and the operation of "shaking the neck portion to the left and right". When the remaining battery charge decreases further, the supply of power to the actuators that drive the wheels may also be stopped, and "pleasure" expressed using only the operation of "shaking the neck portion to the left and right". When the remaining battery charge decreases further, pleasure may be expressed using only the operation of "waving the arm" or the pupil.

The operation control unit 150 expresses an emotion while distributing power to each actuator within the range of the total amount (upper limit value) of power. A motion and a combination of motions may be correlated to various kinds of emotion, such as "pleasure", "dissatisfaction", and "unease". When executing a motion correlated to "pleasure", there are important actuators and actuators that are not so important. For example, an actuator that moves the neck may be more important than an actuator that moves the arm. When the amount of power consumption per unit time exceeds a threshold, or when the remaining battery charge is equal to or lower than a threshold, the operation control unit 150 may stop the supply of power to an actuator of low importance, the actuator that moves the arm for example, when expressing "pleasure".

Also, rather than correlating an emotion expression and an important actuator, a level of priority may simply be provided for an actuator. For example, as the neck is an important part in the robot 100 expressing an emotion, the operation control unit 150 need not regulate the power supply to the actuator 326, which moves the neck. In this way, in addition to giving priority to an actuator with low power consumption, priority may be given to an actuator of high importance for an emotion expression.

The activity monitoring unit 242 may index the "activity amount" of the robot by measuring an operating state, for example, the energization time, power consumption, and the like, of each actuator. When the activity amount (the total activity amount of all the actuators) per unit period of the robot 100 exceeds a predetermined amount, the operation control unit 150 may temporarily restrict the activity amount of the robot 100. Specifically, the operation control unit 150 may stop or reduce the supply of power to an actuator with a low level of priority, or an actuator with large power consumption.

Charging Operation

Figure 16:
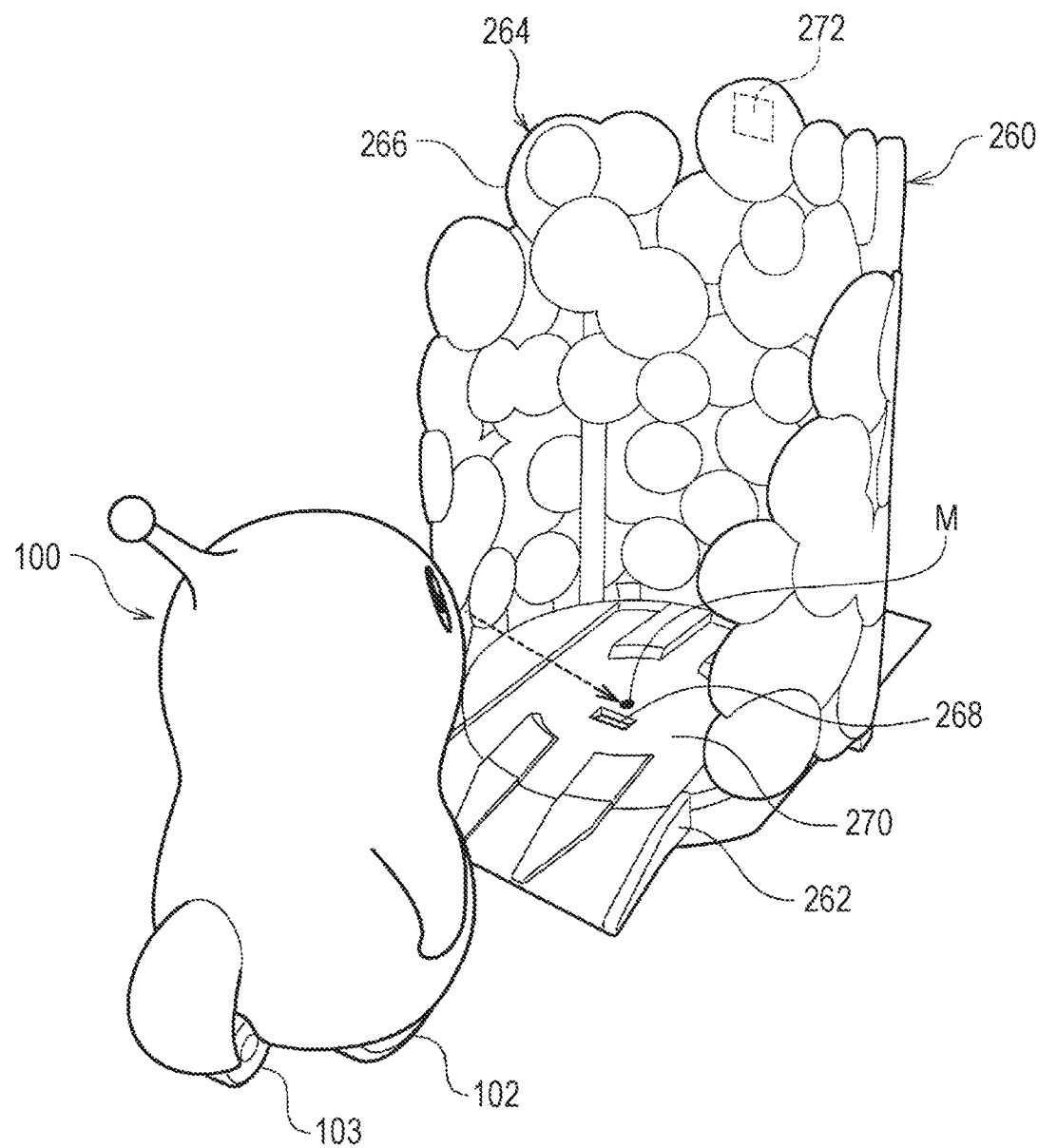
FIG. 16 is an external view of a charging station.

FIG. 16 is an external view of a charging station 260.

The charging station 260 is a charger of the robot 100, and has an internal space that houses the robot 100. Charging is started by the robot 100 entering the charging station 260 (charger) and adopting a predetermined posture.

The charging station 260 includes a table 270, a slope 262 that forms a smooth bridge between an upper surface of the table 270 and the floor surface F, and a frame 264 provided in a periphery of the table 270. A mark M that is used as a guide when the robot 100 enters the charging station 260 is applied to a center of the table 270. The mark M is a circular region of a color differing from that of the table 270.

The frame 264 includes a decorative member 266 that encloses the periphery of the table 270. The decorative member 266 is obtained by a large number of decorative pieces with a tree leaf as a motif being placed one on another, and creates an image of a hedge. A power supply connection terminal 268 is provided in a position somewhat offset from the central mark M in the table 270.

The remaining battery charge monitoring unit 172 of the robot 100 monitors the remaining charge of the battery 118. When the remaining battery charge (charge amount) reaches a predetermined threshold or less, when the charge ratio is 30% or less for example, the robot 100 heads toward the charging station 260. The robot 100 receives a wireless signal from a communicator 272 incorporated in the charging station 260. The robot 100 sets the charging station 260 as a movement target point in accordance with the wireless signal.

The robot 100 films the mark M when entering the charging station 260, and controls a direction of travel of the robot 100 with the mark M as a guide. After the robot 100 enters the charging station 260, the connection terminal 268 is connected to a connection terminal provided in a bottom portion of the robot 100. Because of this, charging circuits of each of the robot 100 and the charging station 260 attain a conductive state.

However, due to various reasons such as an obstacle being placed in an entrance of the charging station 260, the charging station 260 falling sideways, or a failure of the connection terminal 268, a situation wherein the robot 100 cannot be connected to the charging station 260 normally is also envisaged. After setting the charging station 260 as a movement target point, the operation control unit 150 attempts a connection with the charging station 260. When the attempt fails a predetermined number of times (an arbitrary number of one or more), the first transition condition is satisfied. That is, when a predetermined number of connection attempts fail, the mode selection unit 254 changes the operating mode from the normal mode M1 to the power saving mode M2. According to this kind of control method, power wastage due to continually failing in attempts to connect to the charging station 260 can be prevented.

Meanwhile, when the robot 100 detects a moving object, particularly a user, the robot 100 may continue attempting to connect to the charging station 260, without changing to the power saving mode M2. This is because the user may help in the attempt to charge the robot 100, such as by removing an obstacle in front of the charging station 260.

When the recognizing unit 156 detects an obstacle in a path along which the robot 100 heads toward the charging station 260, the mode selection unit 254 may cause the first transition condition to be satisfied, even though no failure of a connection attempt has actually occurred. For example, the robot 100 cannot connect to the charging station 260 when the charging station 260 is installed in the living room, the robot 100 exists in a room differing from the living room, and a door between the room and the living room is closed. In this case, the door forms an "obstacle". At this time, the mode selection unit 254 may change from the normal mode M1 to the power saving mode M2 when nobody is in the periphery.

As heretofore described, the robot 100 in the first modified example autonomously causes the operating mode to change from the normal mode M1 to the power saving mode M2 when the first transition condition is satisfied. Because of this, for example, power can be saved effectively and diligently by grasping realistic timing, even when restricting power consumption when there is no user in the periphery, and the like. Meanwhile, the robot 100 can return automatically from the power saving mode M2 to the normal mode M1 when in a situation in which it is highly necessary to respond to the external environment, as when spoken to or when detecting a user. In particular, the robot 100 can easily be returned from the power saving mode M2 to the normal mode M1 simply by speaking to the robot 100.

By executing a start-up motion corresponding to a return event when returning from the power saving mode M2 to the normal mode M1, behavioral characteristics such that the robot 100 appears to respond subconsciously (the start-up motion) because an incident sufficient to wake the robot 100 up (the return event) has occurred in a state of a low level of consciousness (the power saving mode M2) can be expressed. When detecting a user in the observing mode M21, the robot 100 can return from the observing mode M21 to the normal mode M1 in a natural way by approaching the user while waving the arm 106 (a start-up motion).

Not being limited to an operating mode such as the power saving mode M2, power may be saved by reducing the operating amount of the actuator 256 (operation restriction) when the remaining charge of the battery 118 decreases. Using various kinds of operation restriction, power saving can be realized while expressing by behavior lethargy or fatigue in the movement of the robot 100.

In the observing mode M21, the robot 100 is quiet in comparison with when in the normal mode M1, but expresses behavior of appearing to be aware of a peripheral environment by moving the eye image 174 or the head portion frame 316. When a moving object is detected beside the robot 100, the eye display unit 252 may gaze at the moving object by moving the eye image 174. The observing mode M21, so to speak, expresses a state wherein the body is being rested but the consciousness is working. In the sleeping mode M22, the eye 110 and the actuator 256 do not move, because of which there is a further power saving in comparison with the observing mode M21. The sleeping mode M22, so to speak, is an operating mode that expresses a state wherein the consciousness is not working (a sleeping state). In response to the state wherein the consciousness is not working, the activity level of the robot 100 and an activity level of an actual electrical circuit can be naturally synchronized by suspending the processor 122. In the sleeping mode M22, not being limited to suspending, hibernation that causes a working state in the memory to be saved on the hard disk may be executed. Also, the processor 122 may be caused to return from the suspended state by a return event being detected by an interrupt circuit differing from the processor 122, and an interrupt signal being generated.

When a return event occurs, the operating mode of the robot 100 is changed from the power saving mode M2 to the normal mode M1. At this time, the robot 100 executes a start-up motion. Because of this, for example, a way of being involved that teases the robot 100, by surprising the robot 100 by speaking in a loud voice to the robot 100 in the power saving mode M2, can be adopted. Meanwhile, merely passing beside the robot 100 does not form a first return event, because of which the robot 100 in the sleeping mode M22 does not return to the normal mode M1. A user may show consideration by behaving quietly so as "not to wake up" the robot 100 in the sleeping mode M22 (the sleeping robot 100). This kind of involvement, wherein a user shows consideration to the robot 100, or in other words, the robot 100 causes a user to act carefully, can also be adopted.

The above description states that operation restriction is carried out when the remaining battery charge decreases. In addition to a decrease in the remaining battery charge, various conditions are conceivable as a trigger for operation restriction. When the recognizing unit 156 detects a command via speech from a user, for example, when the recognizing unit 156 detects a speech command including predetermined words such as "keep quiet", the operation control unit 150 may carry out operation restriction. When the recognizing unit 156 detects that the external temperature has deviated from a predetermined range, for example, at "a cold time" of a first temperature T1 or less or "a hot time" of a second temperature T2 (>T1) or greater, the operation control unit 150 may carry out operation restriction. Also, when a total operating time of the robot 100 exceeds a threshold, that is, when the robot 100 "ages", the operation control unit 150 may carry out operation restriction.

In the observing mode M21, the eye generating unit 250 may express a state of the robot 100 "being awake", and looking exactly as though observing the periphery, by causing the eye image 174 to open, and moving the pupil image 164 to the left and right. That is, in the observing mode M21, a motion of slowly moving the line of sight and observing the periphery is executed, without carrying out an advanced image processing or recognition process that applies a high load to CPU resources. Because of this, power consumption is restricted, and the robot 100 being in the process of operating can be expressed. Meanwhile, in the sleeping mode M22, the eye generating unit 250 may express "sleep" by causing the eye image 174 to close.

The processor 122 of the robot 100 may be an aggregation of a main processor and a sub-processor. The main processor realizes a basic function of the data processing unit 136. Meanwhile, the sub-processor is a processor that operates on an operating voltage lower than that of the main processor. A computer program that realizes the functions of the recognizing unit 156 and the operation control unit 150 is mainly executed in the main processor. Meanwhile, functions with a small total load of the eye generating unit 250, the eye display unit 252, the mode selection unit 254, the remaining battery charge monitoring unit 172, and the like, are mainly realized by the sub-processor. For example, the functions of the eye generating unit 250 and the like may be realized by a low-voltage drive compact computer.

When changing the operating mode from the normal mode M1 to the power saving mode M2, the sub-processor may cause the main processor to stop. For example, the sub-processor may cause a clock of the main processor to stop. That is to say, it is sufficient that the sub-processor suspends the main processor. Further, depending on a computing capability of the sub-processor, the eye generating unit 250 may cause the eye image 174 to operate. When a return event is detected, the mode selection unit 254 may cause the clock of the main processor to restart by applying an interrupt to the main processor. According to this kind of control method, a minimum necessary operation of the eye image 174 and the like can be realized by the sub-processor, which has small power consumption, in the power saving mode M2. In other words, power consumption can be restricted, while expressing that the robot 100 is awake, in the observing mode M21.

What is claimed is:

1. A robot, comprising:
   at least one actuator configured to implement a motion;
   a non-transitory computer readable medium, wherein the non-transitory computer readable medium is configured to store instructions; and
   a processor connected to the non-transitory computer readable medium and the at least one actuator, wherein the processor is configured to execute the instructions for:
   selecting a normal mode or a power saving mode, wherein a first power supply to the at least one actuator in the power saving mode is restricted more than a second power supply to the at least one actuator in the normal mode,
   instructing the at least one actuator to implement a start-up motion in response to (1) the robot being in the power saving mode and (2) detection of an occurrence of at least one return event of a plurality of return events, wherein instructing the at least one actuator to implement the start-up motion comprises:
   instructing the at least one actuator to implement a first start-up motion in response to detecting a first return event of the plurality of return events, and
   instructing the at least one actuator to implement a second start-up motion in response to detecting a second return event of the plurality of return events, wherein the first start-up motion is different from the second start-up motion, and the first return event is different from the second return event.

2. The robot according to claim 1, further comprising:
   a display configured to display a pupil image, wherein the processor is configured to instruct the display to change the pupil image based on whether the robot is in the normal mode or the power saving mode.

3. The robot according to claim 2, wherein the processor is configured to instruct the display to display the pupil image in the power saving mode to include a pupil which is more closed than the pupil image in the normal mode.

4. The robot according to claim 1, wherein the first return event comprises detection of speech greater than a first threshold volume or detection of a touch of the robot.

5. The robot according to claim 4, wherein the second return event comprises detection of speech less than the first threshold volume but greater than a second threshold volume.

6. The robot according to claim 4, wherein the second return event comprises detection of movement of an object near the robot.

7. The robot according to claim 1, wherein the power saving mode comprises a first power saving mode and a second power saving mode, and the power supply to the at least one actuator is more restricted in the second power saving mode than in the first power saving mode.

8. The robot according to claim 7, wherein the processor is configured to return the robot to the normal mode from each of the first power saving mode and the second power saving mode in response to detection of the first return event.

9. The robot according to claim 7, wherein the processor is configured to:
return the robot to the normal mode from the first power saving mode in response to detection of the second return event, and
maintain the robot in the second power saving mode in response to detection of the second return event.

10. A robot, comprising:
a detector configured to detect movement of an object;
at least one actuator configured to implement a movement of at least a portion of the robot;
a non-transitory computer readable medium, wherein the non-transitory computer readable medium is configured to store instructions; and
a processor connected to the detector, the at least one actuator and the non-transitory computer readable medium, wherein the processor is configured to execute the instructions for:
selecting a normal mode or a power saving mode, wherein a first power supply to the at least one actuator in the power saving mode is restricted more than a second power supply to the at least one actuator in the normal mode, the power saving mode comprises a first power saving mode and a second power saving mode,
instructing the at least one actuator to execute a motion in response to (1) the robot being in the first power saving mode and (2) detecting movement of the object,
instructing the at least one actuator not to execute the motion in response to (1) the robot being in the second power saving mode and (2) detecting movement of the object,
changing the robot to the normal mode in response to (1) the robot being in the first power saving mode and (2) detecting a first return event, and
maintaining the robot in the power saving mode in response to (1) the robot being in the second power saving mode and (2) detecting the first return event.

11. The robot according to claim 10, wherein the second power saving mode has greater power restriction than the first power saving mode.

12. The robot according to claim 10, wherein the processor is further configured to
change to the first power saving mode in response to (1) a first transition condition being satisfied and (2) the robot being in the normal mode, and
change to the second power saving mode in response to (1) a second transition condition being satisfied and (2) the robot being in the first power saving mode.

13. The robot according to claim 10, further comprising:
a sensor configured to detect an event, wherein
the processor is configured to:
determine the detected event is the first return event in response to a magnitude of the detected event exceeding a first threshold, and
determine the detected event is the second return event in response to the magnitude of the detected event failing to exceed the first threshold.

14. The robot according to claim 13, wherein the first threshold is a volume threshold, and the detected event is speech.

15. The robot according to claim 10, further comprising:
a display configured to display a pupil image, wherein
the processor is configured to instruct the display to change the pupil image based on whether the robot is in the normal mode or the power saving mode.

16. The robot according to claim 15, wherein the processor is configured to instruct the display to display the pupil image in the power saving mode to include a pupil which is more closed than the pupil image in the normal mode.

17. The robot according to claim 10, wherein the processor is configured to instruct the at least one actuator to execute a start-up motion in response to changing the robot to the normal mode, wherein the start-up motion is different from the motion.

18. The robot according to claim 10, wherein the processor is configured to cause a first number of the at least one actuator to operate in response to the robot being in the normal mode.

19. The robot according to claim 18, wherein the processor is configured to cause a second number of the at least one actuator to operator in response to the robot being in the first power saving mode, wherein the second number is less than the first number.

20. The robot according to claim 19, wherein the processor is configured to inhibit operation of the at least one actuator in response to the robot being in the second power saving mode.

* * * * *